(12) United States Patent
McMurtry et al.

(10) Patent No.: US 8,254,022 B2
(45) Date of Patent: Aug. 28, 2012

(54) SAMPLE POSITIONING STAGE AND METHOD OF OPERATION

(75) Inventors: David Roberts McMurtry, Dursley (GB); Ian Sean Bennell, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 339 days.

(21) Appl. No.: 12/448,737

(22) PCT Filed: Jan. 11, 2008

(86) PCT No.: PCT/GB2008/000089
§ 371 (c)(1), (2), (4) Date: Jul. 2, 2009

(87) PCT Pub. No.: WO2008/084242
PCT Pub. Date: Jul. 17, 2008

(65) Prior Publication Data
US 2010/0073672 A1    Mar. 25, 2010

(30) Foreign Application Priority Data

Jan. 11, 2007 (GB) .................................. 0700506.9
Jan. 11, 2007 (GB) .................................. 0700507.7
Jan. 11, 2007 (GB) .................................. 0700519.2

(51) Int. Cl.
*G02B 21/26* (2006.01)
(52) U.S. Cl. ........................................ 359/393; 359/391
(58) Field of Classification Search .................. 356/244, 356/614; 359/393, 391, 368, 507; 74/89.22; 318/563, 652
See application file for complete search history.

(56) References Cited

U.S. PATENT DOCUMENTS

| | | |
|---|---|---|
| 4,189,953 A | 2/1980 | Volk |
| 4,262,991 A | 4/1981 | Wagener et al. |
| 4,378,709 A | 4/1983 | Chitayat |
| 4,652,095 A | 3/1987 | Mauro |
| 4,653,878 A | 3/1987 | Nakasato et al. |
| 4,772,109 A | 9/1988 | Cutburth et al. |
| 5,103,338 A | 4/1992 | Crowley et al. |
| 5,228,357 A | 7/1993 | Dosaka |

(Continued)

FOREIGN PATENT DOCUMENTS

DE    196 01 018 A1    8/1996
(Continued)

OTHER PUBLICATIONS

Media Cybernetics Inc.; Pro-Series Automation Controller Kits; http://www.mediacy.com/pdfs/Automationkit.pdf; 2006; Accessed May 9, 2007.

(Continued)

*Primary Examiner* — Sang Nguyen
(74) *Attorney, Agent, or Firm* — Oliff & Berridge, PLC

(57) ABSTRACT

A sample positioning stage for positioning a sample to be inspected relative to an optical inspection device. The stage includes a first generally planar body on which a sample to be inspected can be carried and a second body directly coupled to the first body via bearings extending between them which constrain movement of the first body relative to the second body to a first plane that is substantially parallel to the plane of the first body. There is also provided a drive system being selectively operable in a first mode and a second mode.

31 Claims, 15 Drawing Sheets

U.S. PATENT DOCUMENTS

| | | | |
|---|---|---|---|
| 5,374,125 A | 12/1994 | McMurtry et al. | |
| 5,497,060 A | 3/1996 | Juergens, III | |
| 5,672,816 A | 9/1997 | Park et al. | |
| 5,684,628 A | 11/1997 | Gerhard | |
| 5,763,965 A | 6/1998 | Bader | |
| 5,802,925 A | 9/1998 | Kanao | |
| 5,969,857 A * | 10/1999 | Byun | 359/393 |
| 5,996,437 A | 12/1999 | Novak et al. | |
| 6,006,140 A * | 12/1999 | Carter | 700/56 |
| 6,252,705 B1 | 6/2001 | Lo et al. | |
| 6,341,037 B1 * | 1/2002 | Tanaka et al. | 359/393 |
| 6,369,940 B1 * | 4/2002 | Nishida et al. | 359/393 |
| 6,400,395 B1 | 6/2002 | Hoover et al. | |
| 6,963,394 B2 * | 11/2005 | Yamamoto et al. | 356/237.4 |
| 7,136,708 B2 * | 11/2006 | Yamaguchi | 700/64 |
| 2004/0027008 A1 | 2/2004 | Kaczynski | |
| 2007/0153369 A1 | 7/2007 | Schutze et al. | |
| 2009/0310215 A1 * | 12/2009 | Stimpson et al. | 359/393 |

FOREIGN PATENT DOCUMENTS

| | | |
|---|---|---|
| EP | 0 207 121 B1 | 1/1990 |
| EP | 0 500 106 A1 | 8/1992 |
| EP | 1 193 518 A2 | 4/2002 |
| EP | 1 367 423 A1 | 12/2003 |
| GB | 1098575 | 1/1968 |
| GB | 2 034 913 A | 6/1980 |
| GB | 2 201 809 A | 9/1988 |
| JP | A-61-38215 | 2/1986 |
| JP | A-3-139609 | 6/1991 |
| JP | A-10-197802 | 7/1998 |
| JP | A-10-227981 | 8/1998 |
| JP | A-11-109246 | 4/1999 |
| JP | A-11-287957 | 10/1999 |
| JP | 2006-323075 | 11/2006 |
| WO | WO 00/04304 A1 | 1/2000 |
| WO | WO 02/084223 A1 | 10/2002 |
| WO | WO 2005/114104 A1 | 12/2005 |
| WO | WO 2005/124282 A2 | 12/2005 |
| WO | WO 2008/084246 A1 | 7/2008 |

OTHER PUBLICATIONS

Prior Scientific Brochure; ProScan II; "High Performance Motorized Stage Systems." (Date Unknown).

Prior Scientific Manual; 6.15; "Encoders;" Feb. 2007; pp. 68-71; version 4.

Nobel Biocare Brochure, Procera scanners, "Procera Piccolo, Procera Forte," 2007.

Nobel Biocare Media Release; "Nobel Biocare is launching a new Ceramic Bridge and a new Procera Scanner;" Gothenburg, Aug. 26, 2004, pp. 1-2.

Nobel Biocare, "Online Instructions for using the Procera Forte Software;" Sep. 2004; Accessed Sep. 22, 2009.

Forte Drive Rod. (Date Unknown).

"Measuring the modern way;" http://www.zeiss.com; Accessed Oct. 20, 2009.

Zeiss UMM500 X Axis Bearing Scheme; Accessed Oct. 20, 2009. (Date Unknown).

International Search Report issued in PCT/GB2008/000089 on Apr. 21, 2008.

British Search Report issued in GB0700506.9 on May 10, 2007.

British Search Report issued in GB0700507.7 on May 21, 2007.

British Search Report issued in GB0700519.2 on May 10, 2007.

U.S. Appl. No. 12/448,679, filed Jun. 30, 2009.

Office Action issued on Dec. 8, 2011 in related U.S. Appl. No. 12/448,679.

Office Action issued in Japanese Application No. 2009-545232 dated May 25, 2012 (with translation).

* cited by examiner

SAMPLE POSITIONING STAGE AND METHOD OF OPERATION

BACKGROUND

The present invention relates to a sample positioning stage, such as a stage used to position a sample for inspection by an optical inspection apparatus, for instance a microscope or spectroscope.

Sample positioning stages can be used, for example, to position samples relative to microscopes and spectroscopes, and can comprise an examination plate onto which a sample to be inspected can be placed. A generally planar examination plate is typically mounted on at least one carriage so that the plate can move relative to the carriage in at least one substantially horizontal degree of freedom. This enables the position of a sample on the examination plate to be moved relative to an examination device which is inspecting the sample. Powered sample positioning stages include a drive system which can be operated to move the examination plate relative to the carriage. The drive system can control the relative position of the examination plate according to a pre-programmed algorithm, and/or according to an input signal received from an input device such as a trackball or joystick.

SUMMARY

However, in addition to being able to move the stage under the control of a powered drive system, it can be desirable to move the stage manually by dragging the stage to a desired position.

The present invention relates to a sample positioning stage in which it is possible to move the stage under the control of an electronic input device, and also by physically manipulating the stage.

According to a first aspect of the present invention there is provided a sample positioning stage for positioning a sample to be inspected relative to an optical inspection device, the stage comprising: a first generally planar body on which a sample to be inspected can be carried; a second body directly coupled to the first body via bearings extending between them which constrain movement of the first body relative to the second body to a first plane that is substantially parallel to the plane of the first body; a drive system being selectively operable in a first mode to drive the first and second bodies in the first plane relative to each other toward a demanded relative position received from an electronic position input device, and a second mode in which the drive system provides less resistance to the relative movement of the first and second bodies in the first plane by an external force exerted on the first body than in the first mode, the drive system being engaged in both the first and second modes; and a selector operable to change the mode of operation from the first mode to the second mode in response to an input received at the stage.

It is an advantage of the sample positioning stage of the invention that as the selector changes the mode of operation in response to an input received at the stage, the user can remain in the vicinity of the stage whilst changing the mode of operation.

It is a further advantage of the present invention that the drive system is engaged in both the first and second modes because this means that there is no need to disengage the drive system in order to facilitate manual dragging of the stage. Accordingly, there is no need to provide a clutch mechanism which disengages the drive system's motor from the first or second body in order to enable the stage to be moved manually, i.e. the drive system is clutchless. Rather, the drive system is in permanent engagement with the body on which it acts in both the first and the second modes and will be driven (either actively or manually back-driven) in the second mode due to any relative movement of the first and second bodies caused by an external force exerted on the first body in the first plane. This reduces the complexity and cost of the stage apparatus. As the resistance provided by the drive system is less in the second mode than in the first mode, then it will be easier for the user to move the first and second bodies relative to each other in the second mode. This will enable the user to move the bodies into the desired position more quickly than by moving them using the drive system. It also means that the user's hands do not need to handle a remotely attached device, such as a joystick, and so leaves them free to work in the vicinity of the first and second bodies.

It is also an advantage of the invention that if one of first and second bodies collides with an object, then the drive system can be switched to operate in the second mode so as to prevent damage to the stage and/or object.

The drive system can be configured so that the resistance it provides can vary. The resistance provided by the drive system can be configured to depend on the magnitude of the external force. The preferred maximum resistance the drive system can provide can depend on a number of factors such as the size and mass of the first and second bodies, and the environment in which the stage apparatus is to be used.

As will be understood, when the external force is equal to the resistance provided by the drive system, then the drive system and the external force will be in equilibrium. In this state the first and second bodies will not move relative to each other, despite the application of the external force.

When the external force is greater than the resistance provided by the drive system, then the first and second bodies will move relative to each other.

Preferably, the resistance provided by the drive system is at least 50% less in the second mode than in the first mode, more preferably at least 75% less in the second mode than in the first mode, especially preferably at least 90% less in the second mode than in the first mode. Preferably, the level of resistance to the relative movement of the first and second bodies in the second mode provided by the drive system is sufficiently low so as not to be detectable by a user. Preferably, the level of resistance to the relative movement of the first and second bodies in the second mode provided by the drive system is not more than 50 N, more preferably is not more than 10 N, especially preferably is not more than 1 N. Most preferably, the drive system provides no user detectable resistance to the relative movement of the first and second bodies. In particular, preferably, the drive system does not actively resist relative movement of the first and second bodies in the second mode.

The drive system can comprise a controller for controlling a motorised drive unit. Accordingly, in this case, the motorised drive unit can impart the driving force on the first body or the second body in the first mode to cause relative movement. The controller can control the operation of the motorised drive unit in response to demanded relative positions received from an electronic position input device in order to drive the first and second bodies relative to each other.

Suitable drive units for use with the present invention include mechanisms such as belt drives, ball screws, rack and pinion, and direct drives. In a particularly preferred embodiment the drive unit comprises a motor body for controlling a drive part which is in engagement with the first or second body in order to drive the relative movement of the first or second part. For instance, the drive part can be a drive shaft extending from the motor body for engagement with a track, such that rotation of the drive shaft by the motor body causes relative movement between the drive shaft and the track along the track's extent. Preferably, the motorised drive unit is configured such that rotation of the drive shaft causes relative movement between the drive shaft and the track in a dimension perpendicular to the rotational axis of the drive shaft. Preferably, the drive shaft is configured to frictionally engage a friction rod. Accordingly, preferably the drive unit, comprises a friction drive.

Preferably, in embodiments in which at least one of the bearings between the first and second bodies comprises a track (as described in more detail below) the motorised drive system acts on the bearing's track to cause relative movement.

This is advantageous because it enables the stage to be made more compact and lightweight. It also reduces the amount of torque exerted on the bodies by the motor about the bearing. For instance, in embodiments in which the motorised drive system comprises a motor having a drive shaft for engaging a friction rod, preferably the drive shaft frictionally engages the bearing's track. Accordingly, the bearing's track can be the friction rod.

Many suitable electronic position input devices are available for inputting a demanded relative position. For instance, the electronic position input device can be a joystick, trackball or other device which a user can manipulate to input a demanded relative position. The electronic position input device can be a memory device which contains pre-stored demanded relative positions. Optionally, the electronic position input device can be a processor unit, for instance a general purpose computer which can provide demanded relative positions from a computer program. Accordingly, a user could program a sequence of positions which the program runs through to control the position of the stage apparatus. This provides for a simple way of obtaining a montage of the sample being inspection to be obtained.

Preferably, the selector is configured to detect the application of an external force exerted on at least one of the first and second bodies in the first plane. Optionally, the apparatus could be configured such that the selector can detect the application of an external force exerted at a predetermined point on at least one of the first and second bodies. Preferably, the apparatus is configured such that the selector can detect the application of an external force exerted anywhere on at least one of the first and second bodies. The selector can be configured to output a signal which indicates the detection of the application of the external force. The output signal could be a signal which is detectable by a user. For instance, the output signal can be an audible signal. Optionally the output signal can be a visual signal. This could be useful to indicate to the user that something is interfering with the relative positioning of the first and second bodies.

Preferably, the selector is configured to change the mode of operation of the drive system from the first mode to the second mode on detection of the application of the external force exerted on one of the first and second bodies in the first plane. This is advantageous as it does not require user intervention in order to change to the second mode of operation. This can be useful in circumstances in which a user is not always present during the operation of the stage, and/or where it is preferable that the user need not have to consciously switch to the second mode of operation.

Preferably, the selector is configured to change the mode of operation of the drive system from the first mode to the second mode only when the external force exceeds a predetermined threshold force. This is advantageous as it can help prevent accidental switching of the mode of operation to the second mode. The predetermined threshold force can depend on a number of factors, such as at least one of the size and mass of the first and second bodies, and the environment in which the stage apparatus is to be used. Preferably, the predetermined threshold force is not more than 100 N, more preferably not more than 50 N, especially not more than 10 N, for example not more than 3 N. Preferably, the predetermined threshold force is not less than 0.5 N, more preferably not less than 1 N, especially preferably not less than 2 N.

The selector can be configured to change the mode of operation of the drive system from the first mode to the second mode on detection of the application of the external force for a predetermined length of time. This is advantageous as it can help prevent accidental switching of the mode of operation to the second mode. The preferred predetermined length of time can depend on a number of factors, such as the environment in which the stage apparatus will be used. Preferably, the preferred predetermined length of time is not more than 5 seconds, more preferably is not more than 3 seconds, especially preferably is not more than 1 second. Preferably, the preferred predetermined length of time is not less than 1 mS, more preferably is not less than 10 mS, especially preferably is not less than 25 mS.

The selector could comprise a sensor for measuring the application of an external force on one of the first and second bodies. The sensor could be a force transducer. The selector could be configured to change the mode of operation from the first mode to the second mode when the magnitude of the force measured by the force transducer exceeds a predetermined threshold.

Preferably, the selector is configured to detect the application of an external force exerted on one of the first and second bodies by determining if the first and second bodies are behaving in an expected manner. If the first and second bodies are not behaving in an expected manner, then the selector can be configured to change the mode of operation from the first mode to the second mode.

Preferably, the selector comprises a sensor which is configured to detect relative movement of the first and second bodies. For instance, the sensor could comprise an accelerometer on each of the first and second bodies to determine if they are accelerating relative to each other. Preferably, the sensor is configured to detect the relative position of the first and second bodies. This is advantageous, because it enables the apparatus to be able to determine the relative position of the first and second bodies. Accordingly, the apparatus can keep track of the relative position of the first and second bodies even when they are manually moved relative to each other by the application of an external force. Preferably, the sensor comprises a readhead on one of the first and second bodies which can read a scale on the other of the first and second bodies to detect a change in the relative position of the first and second bodies.

Suitable scales include those having marks defining a pattern which can be read by a readhead in order to determine relative movement between them. For instance, the scale can be an incremental scale having scale marks defining a periodic pattern which generates a periodic signal at the readhead when relative movement between the scale and readhead take place. These periodic signals produce an up/down count which enables displacement between the scale and the readhead to be determined. For instance, such a suitable scale is described in European Patent Application no. 0207121, the entire content of which is incorporated into the specification of the present application by this reference. The scale can have reference marks which are detectable by the readhead so that it can determine the exact position of the readhead relative to the scale. For example, such a scale is disclosed in Published International Patent Application WO 2005/124282, the entire content of which is incorporated into the specification of the present application by this reference. Optionally, the scale can be an absolute scale which has scale markings which enable the readhead to determine an exact absolute position relative to the scale without the need to incrementally count from a predetermined position. Such scales typically have scale markings which define unique position data. The data can be in the form of, for instance, a pseudorandom sequence or discrete codewords. Such a scale is disclosed in International Patent Application no. PCT/GB2002/001629, the entire content of which is incorporated into the specification of the present application by this reference.

Position data from the readhead could be used be used in order to determine the relative position of the first and second bodies. Optionally, the position data could be used in a control algorithm to detect when the first and second bodies are moving relative to each other. Furthermore, position information from the readhead could be used by the drive system, for instance by the drive system's controller, as part of a servo loop in order to accurately drive the first and second bodies relative to each other to a demanded relative position.

Preferably, the selector is configured to compare data which indicates the expected relative movement of the first and second bodies to data from the sensor which indicates the actual relative movement of the first and second bodies, and to change the mode of operation of the drive system from the first mode to the second mode when the actual relative movement is different to the expected relative movement.

Data which indicates the expected relative movement of the first and second bodies ("expected relative movement data") can be received by the selector from the position input device. The selector can be configured to determine the expected relative movement data from data received from the position input device. For instance, the position input device could provide the selector with a demanded relative position of the first and second bodies, and could determine the expected relative movement from the demanded relative position. The selector could then determine the actual relative movement and compare it with the expected relative movement.

The expected relative movement data can indicate whether or not it is expected that the first and second bodies are moving relative to each other. The expected relative movement data can comprise a directional component which indicates the expected direction of relative movement between the first and second bodies. The expected relative movement data can quantify the expected relative movement between the first and second bodies.

The drive system can be configured so that it cannot be manually back driven. Accordingly, the drive system can be configured so that the first and second bodies cannot be moved relative to each other by merely exerting a force on one of the first and second bodies. For instance, the drive system can comprise a lead screw drive mechanism. In this case, preferably the drive system actively drives the first and second bodies in the direction of the external force exerted on one of the first and second bodies. Accordingly, in this case when the drive system is in the second mode, the drive system assists the movement of the first and second bodies in the direction of the external force exerted on one of the first and second bodies.

Preferably, the drive system can be manually back driven. Preferably, the drive system is configured to resist manual back driving in the first mode and not to resist manual back driving in the second mode. That is, preferably, the drive system is configured to not actively drive against any manual back driving of the drive system in the second mode.

Preferably, the drive system comprises a motor and a power source. Preferably, the stage apparatus is configured such the force applied by the motor is controlled via the power source. Preferably, in the first mode, the motor is configured to provide resistance to back driving. Preferably, in the second mode no resistance to back driving is provided by the motor.

Preferably, the power source is operable to vary the net force applied by the motor so as to cause the drive unit to effect relative movement between the first and second bodies. Preferably, the power source can cause a plurality of different net forces to be applied by the motor to effect different levels of drive.

Preferably, when in the first mode, the power source is configured to increase the net force applied by the motor up to a maximum net force when the actual relative movement of the first and second bodies is different to the expected relative movement. Therefore, when in the first mode, if an external force is exerted on one of the first and second bodies the power source will preferably increase the output force so as to increase the resistance of the drive system. Accordingly, preferably the motor is served to keep the first and second bodies at a desired position.

Preferably, the selector is configured to monitor the net force applied by the motor. Preferably, the selector is configured to change the mode of operation of the drive system from the first mode to the second mode when the net force applied is at the maximum net force, and when it is determined that the actual relative movement is different to the expected relative movement. The selector can be configured to change the mode of operation only when this condition has been met for a predetermined length of time. The preferred predetermined length of time will vary depending on a number of factors, such as the environment in which the stage apparatus will be used. Preferably, the preferred predetermined length of time is not more than 5 seconds, more preferably is not more than 3 seconds, especially preferably is not more than 1 second. Preferably, the preferred predetermined length of time is not less than 1 mg, more preferably is not less than 10 mS, especially preferably is not less than 25 mS.

Preferably, the motor is an electrically powered motor. Accordingly, preferably the stage apparatus is configured such that a net voltage is applied via an electrical power source in the first mode to provide the resistance to back driving. Preferably, no net voltage is applied via the electrical power source in the second mode so that no resistance to back driving is provided by the electrically powered motor.

When the drive system comprises at least one electrically powered drive unit, such as an electrical motor, the selector can determine the application of the external force by monitoring the back e.m.f. of the electrical drive unit. Accordingly, an unexpected increase in the back e.m.f of the electrical drive unit can indicate that the power output to the drive unit is being increased due to an increase in the resistance of the relative movement between the first and second bodies toward a demanded relative position.

Preferably, the sample positioning stage is configured such that in the second mode, the first and second bodies will tend to not move relative to each other on removal of the external force exerted on at least one of the first and second bodies regardless of the relative position of the first and second bodies. Accordingly, preferably the first and second bodies are not biased toward any particular rest relative position.

The selector could be configured to change the mode of operation from the first mode to the second mode in response to a second input received at the stage. Preferably, the selector is configured to change the operation mode of the drive system from the second mode into the first mode on removal of the external force. Preferably, the selector is configured to determine that the external force has been removed on detection that the first and second bodies are stationary relative to each other. Preferably, the selector is configured to change the operation mode of the drive system from the second mode into the first mode not later than 2 seconds after determination of the removal of the external force, more preferably not later than 1 second after determination of the removal of the external force. Preferably, the selector is configured to change the operation mode of the drive system from the second mode into the first mode not earlier than 100 mS after determination of the removal of the external force.

The drive system could be configured to move the first and second bodies to a predetermined relative position on removal of the external force. Preferably the first and second bodies remain in their relative position on removal of the external force. Accordingly, the user can simply reposition the first and second bodies by manually dragging one of them to the desired position and letting go. Preferably, the drive system is configured so that, on removal of the external force, the first and second bodies are moved relative to each other only on receipt of a second demanded relative position from the position input device.

As described above, the drive system can be configured to drive the first and second bodies relative to each other toward a demanded position received from the position input device whenever the first and second bodies are not at that relative position. In this case, preferably, when the mode of operation is changed from the second mode to the first mode, the demanded relative position is set as being the actual relative position of the first and second bodies, on re-entering the first mode.

The selector can comprise a switch which is manipulable by the user to change the mode of operation between the first and second modes without having to cause relative movement between the first and second bodies. The switch can be a device for opening and breaking an electric circuit. The switch can comprise a button operable by a user to switch between the first and second modes. The switch can comprise a transducer. The switch could comprise a photodetector. Optionally, the switch could comprise a microphone. Preferably, the switch is located on the first body or on the second body.

Preferably, at least one of the first and second bodies comprises a handle for facilitating manual manipulation of the first and second bodies. This aids the application of an external force to at least one of the first and second bodies. Preferably, the handle suspends from one of the first and second bodies. Optionally, the handle can comprise the selector such that when the handle is manipulated by the user it switches the mode of operation from the first mode to the second mode.

The stage apparatus can comprise an eject selector. The drive system can be configured to move the first and second bodies to a predetermined eject position on activation of the eject selector.

Preferably, the relative movement of the first and second bodies is constrained via the bearings to a first degree of freedom which lies substantially parallel to the plane of the first body. The first degree of freedom could be a rotational degree of freedom. Accordingly, in this case the first and second bodies would be able to rotate relative to each other about an axis. The first degree of freedom could be a linear degree of freedom.

Preferably, the stage apparatus comprises a third body directly coupled to the second body via bearings extending between them so that the second and third bodies can move relative to each other in a second degree of freedom. Preferably, the first and second degrees of freedom are linear dimensions. Preferably, the first and second degrees of freedom are orthogonal to each other. Preferably, the second degree of freedom lies in a plane that is substantially parallel to the plane of the first body.

In this case, preferably there is provided a second drive system being selectively operable in a first mode to drive the second and third bodies in the second degree of freedom relative to each other toward a demanded relative position received from an electronic position input device. Preferably, the second drive system is also operable in a second mode in which the second drive system provides less resistance to the relative movement of the second and third bodies in the second degree of freedom by an external force exerted on the second body than in the first mode. Preferably, as is the case with the drive system for driving the first and second bodies ("the first drive system"), the second drive system is engaged in both the first and second modes.

There can be provided a second selector operable to change the mode of operation of the second drive system from the first mode to the second mode in response to an input received at the stage. Preferably, the selector is operable to change the mode of operation of the first and second drive systems from their first modes to their second modes in response to an input received at the stage. The selector could be operable to change the mode of operation of the first drive system independently from the mode of operation of the second drive system. Accordingly, the selector could be configured to change only the mode of operation of the first drive system, or the second drive system, or both the first and second drive systems from their first mode of operation to their second mode of operation in response to an input received at the stage. For instance, the selector could be configured to change the mode of operation of only the first drive system from the first mode to the second mode when it detects that an external force has been applied to the first body in the first degree of freedom only. Furthermore, the selector could be configured to change the mode of operation of only the second drive system from the first mode to the second mode when it detects that an external force has been applied to the first body in the second degree of freedom only. Preferably, the selector is configured to change the mode of operation of both of the first and second drive systems from their first modes to their second modes when it detects that an external force has been applied to the first body in either or both of the first and second degrees of freedom.

The stage can be for use in an optical inspection apparatus, such as a microscope or a spectroscope. Preferably, the stage is for use in high resolution systems. For example, the stage can be for use in a high resolution system in which the resolution of the positioning of the first body to the second body is at least four orders of magnitude higher than the range though which the first and second bodies can move relative to each other, more preferably at least five orders of magnitude, especially preferably at least six orders of magnitude.

Preferably, at least a portion of each of the first and second bodies (and third body if present) permits the transmission of light. As will be understood, light can be visible, infrared or ultraviolet light. This is advantageous as it enables the illumination of a sample placed on the first body. The portion can be a transparent or translucent part of the body. Optionally, the portion can be an opening in the body. Preferably, in embodiments in which the first degree of freedom is linear, preferably the portion of at least one of the first and second bodies is elongate. The portion can be elongate in a dimension perpendicular to the linear degree of freedom in which the first and second bodies can move relative to each other. In embodiments in which the second body is directly coupled to a third body, preferably the second body's portion is elongate in a dimension parallel to the linear degree of freedom in which the second and third bodies can move relative to each other.

The second body could be directly coupled to the first body via at least one rigid bearing and at least one resiliently compliant bearing provided between the first and second bodies. Preferably, the at least one rigid bearing and the at least one resiliently compliant bearing are arranged generally opposite each other and configured such that the first and second bodies are preloaded against each other in a dimension substantially parallel to the plane of the first generally planar body via the bearings. Preferably, the stage is configured such that movement of the first body relative to the second body is constrained to a first plane that is substantially parallel to the plane of the first body via the bearings. Preferably, the drive system imparts its driving force on the stage closer to the at least one rigid bearing than the at least one resiliently compliant bearing. The stage can further comprise a position sensing device on at least one of the first and second bodies for providing a measure of the relative position of the first and second bodies. Preferably, the position sensing device is located closer to the at least one rigid bearing than the at least one resiliently compliant bearing. Preferably, the at least one rigid bearing and at least one resiliently compliant bearing are arranged substantially opposite each other such that the direction of the net bias force which the at least one rigid bearing is under is substantially opposite to the direction of the net bias force which the at least one resiliently compliant bearing is under. Preferably, the at least one rigid bearing and the at least one resiliently compliant bearing are arranged such that, in embodiments in which the at least one resiliently compliant bearing provides the bias force, each of the at least one resiliently compliant bearing is configured to bias at least one of the rigid bearings in bearing engagement. Preferably, the at least one rigid bearing and the at least one resiliently compliant bearing are arranged such that the net force provided by the at least one resiliently compliant bearing biases each of the rigid bearings into bearing engagement. Preferably, the at least one resiliently compliant bearing and the at least one rigid bearing are configured such that the force provided by the bias of the resiliently compliant bearings on each of the rigid bearings is substantially the same.

Details of such a sample positioning device are disclosed in the co-pending PCT application entitled A Sample Positioning Apparatus which is filed with the present application bearing agent's reference 0766/WO/0 and claiming priority from UK Patent Application nos. 0700519.2, 0700507.7 and 0700506.9. Subject matter that is disclosed in that application is incorporated in the specification of the present application by this reference.

Suitable bearings for use with the present invention include sliding bearings and roller bearings such as cross-roller bearings. For example, at least one of the rigid and resiliently compliant bearings can comprise roller bearings, such as ball bearings, being located between tracks on the first and second bodies.

Preferably, each of the bearings comprise a first bearing formation on the first body and a first bearing formation on the second body which cooperate to form the bearing. The bearing formation can comprise a bearing part which facilitates relative movement between the bodies in the degree of freedom. The bearing formation can also comprise a mount via which the bearing part is mounted to one of the first and second bodies. For example, the first and second bearing formations can comprise a track on one of the first and second bodies and a runner on the other for cooperating with the track. As will be understood, the track can be any suitable feature on one of the bodies which defines a path which the runner on the other of the bodies is configured to follow. The track can be profiled, for example toothed. In this case the runner could be cog-shaped such that the track and runner engage like a rack and pinion mechanism. Preferably the track is smooth. In this case the runner could be configured to engage the track such that it can slide along the track. Optionally, the runner could be a roller configured to roll along the track. For instance, the runner could be a wheel.

As will be understood, different combinations of the types of bearings could be used. For instance, the at least one bearing could be a sliding bearing and at least one other bearing could be a roller bearing. Preferably, the same type of bearing is used for each of the bearings. Preferably, the bearings each comprise a track and a roller for rolling along the track.

A track can be provided by at least one recess in the first or second body. A track can be provided by at least one projection on the first or second body. The profile of a track taken perpendicular to the length of the track can be curved, for example at least part elliptical, preferably at least part circular, for example semi-circular. A track can be provided as an integral part of one of the first and second bodies. For example, a track and the body on which it is provided can be formed as one piece. A track can be provided as a separate piece which is mounted on one of the first and second bodies. For example, one of the first and second bodies can comprise a mounting for a track. Preferably the mounting supports a track substantially along its length.

Movement of the first body relative to the second body is constrained to a first plane that is substantially parallel to the plane of the first body via the bearings. Accordingly, the first and second bodies are constrained from moving relative to each other in a dimension perpendicular to the plane of the first body via the bearings. The bearing formations on the first and second bodies which cooperate to form the bearings could comprise cooperating formations which prevent the first and second bodies from moving relative to each other in a dimension perpendicular to the plane of the first body. For instance, the bearing formations could have inter-engaging formations, such as a projection and groove arrangement, which prevents the first and second bodies from moving relative to each other in a dimension perpendicular to the plane of the first body Optionally, the bearing formations on the first and second bodies which cooperate to form the bearings could be configured to frictionally engage under the preload so as to prevent the first and second bodies from moving relative to each other in a dimension perpendicular to the plane of the first body via the bearings.

According to a second aspect of the invention there is provided an optical inspection apparatus comprising: an optical inspection component; and a sample positioning stage as claimed in any preceding claim for positioning a sample to be inspected relative to the optical inspection device. Suitable optical inspection apparatus include microscopes and spectroscopes. Accordingly, as will be understood, suitable optical inspection component could be an objective lens for collecting optical information from a sample placed on the sample positioning stage.

According to a third aspect of the invention, there is provided a method of operating sample positioning stage having a first generally planar body on which a sample to be inspected can be carried and a second body directly coupled to the first body via bearings extending between them which constrain movement of the first body relative to the second body to a first plane that is generally horizontal and substantially parallel to the plane of the first body, and a drive system operable to move the first and second bodies relative to each other toward a first demanded relative position received from the position input device, the method comprising: i. operating the drive system in a first mode in which the drive system is operable to drive the first and second bodies in the first plane relative to each other toward a demanded relative position received from an electronic position input device, the drive system providing a first level of resistance to relative movement of the first and second bodies in the first plane by an external force exerted on one of the first and second bodies in the first plane; and ii. in response to an input received at the stage, subsequently operating the drive system in a second mode, in which the drive system provides a second level of resistance to the relative movement of the first and second bodies in the at least one degree of freedom by an external force exerted on one of the first and second bodies, the second level of resistance being less than the first level of resistance, in which the drive system is engaged in both the first and second modes.

Preferably, the method further comprises detecting the application of an external force exerted on one of the first and second bodies.

Preferably, the method further comprises automatically changing the mode of operation of the drive system from the first mode to the second mode on detection of the application of the external force.

Preferably, the step of detecting the application of an external force comprises comparing data which indicates the expected relative movement of the first and second bodies to data which indicates the actual relative movement of the first and second bodies.

Preferably, the method further comprises changing the mode of operation of the drive system from the first mode to the second mode when the actual relative movement is different to the expected relative movement for a predetermined length of time.

Preferably, operating the drive system in the first mode comprises applying a net voltage to the drive system up to a maximum net voltage.

Preferably, operating the drive system in the second mode comprises applying no net voltage to the drive system.

Preferably, the method further comprises monitoring the net voltage applied, and changing the mode of operation of the drive system from the first mode to the second mode when the net voltage applied is at its maximum net voltage, and when the actual relative movement is different to the expected relative movement for a predetermined length of time.

Preferably, the method further comprises changing the mode of operation of the drive system from the second mode to the first mode on detection of the removal of the external force.

According to a fourth aspect of the invention there is provided a sample positioning stage for positioning a sample to be inspected relative to an optical inspection device, comprising: a first generally planar body on which a sample to be inspected can be carried; a second body directly coupled to the first body via bearings extending between them which constrain movement of the first body relative to the second body to a first plane that is substantially parallel to the plane of the first body; a drive system operable in a first mode to move the first and second bodies relative to each other toward a demanded relative position received from an electronic position input device; and a selector which is configured to detect the application of an external force exerted on the first body in the first plane and to change the mode of operation of the drive system from the first mode into a second mode on detection of the application of the external force, wherein in the second mode the drive system provides less resistance to the relative movement of the first and second bodies by an external force exerted on the first body than in the first mode.

This application also describes a movement apparatus, comprising: a first body; a second body having a track, the second body coupled to the first body so that the first and second bodies can move relative to each other; a drive unit having a motor body and a drive shaft, at least a portion of which is exposed for frictional engagement with the track so that rotation of the drive shaft about its axis causes relative movement between the first and second bodies; and a bias mechanism which acts between the first body and the portion of the drive shaft which is exposed for frictional engagement with the track so as to bias the drive shaft into frictional engagement with the track.

This application further describes a stage kit, comprising: a first body having a track; a second body, which is configured to be coupled to the first body so that the first and second bodies can move relative to each other; a runner coupled to the second body, for co-operation with the track when assembled so as to facilitate relative movement of the first and second bodies; and a resiliently deformable mechanism which can be deformed so as to act between the second body and the runner so as to bias the runner into the track when the first and second bodies are assembled together, in which the resiliently deformable mechanism is configured to be plastically deformed when the first and second bodies are assembled together. Accordingly, preferably the stage kit is configured so that when the first and second bodies are assembled together, the force on the resiliently deformable mechanism is such that it is deformed beyond its yield point. Therefore, when the first and second bodies are disassembled, the resiliently deformable mechanism retains some of the deformation, and will not return to its preassembled shape and position. The resiliently deformable mechanism can be provided as a separate component to the second body. For instance, the resiliently deformable mechanism can be a spring device, such as a coil spring, which acts between the second body and the runner. In this case, the runner can be coupled to the second body by an arm so as to support the runner. The arm can be hinged to the second body so as to allow the arm and runner to move relative to the second body. Optionally, the arm could be deformable so as to allow the arm and runner to move relative to the second body. Preferably, the second body and the resiliently deformable mechanism are formed as one piece. More preferably, the second body and the resiliently deformable mechanism are formed from the same material. This can reduce the complexity of the stage kit as it reduces the number of components needed. This can decrease the manufacturing cost, and also can improve the reliability of the stage.

BRIEF DESCRIPTION OF THE DRAWINGS

An embodiment of the invention will now be described with reference to the accompanying drawings in which:

FIG. 15a is schematic underside view of the second guide rod, drive shaft and bearing wheels of the first and second carriages shown in FIGS. 1 to 14;

FIG. 15b is a schematic cross-sectional view of the drive shaft and guide rod shown in FIG. 15a; and FIG. 15c is a schematic cross-sectional view of a bearing wheel and guide rod shown in FIG. 15a.

DETAILED DESCRIPTION OF EMBODIMENTS

Figure 1:
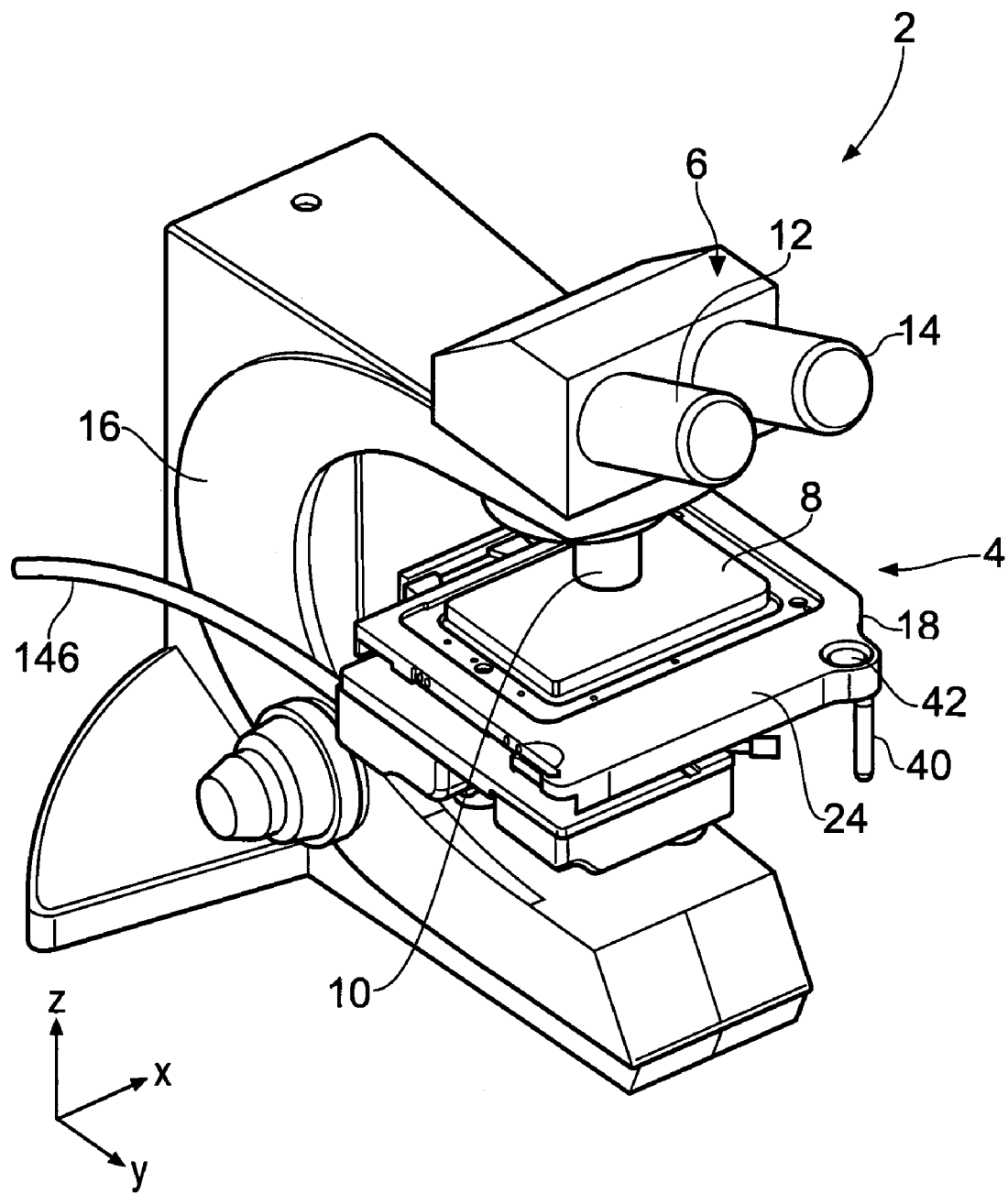
FIG. 1 is a perspective view of an optical inspection apparatus having a sample positioning stage according to the present invention.
Figure 2:
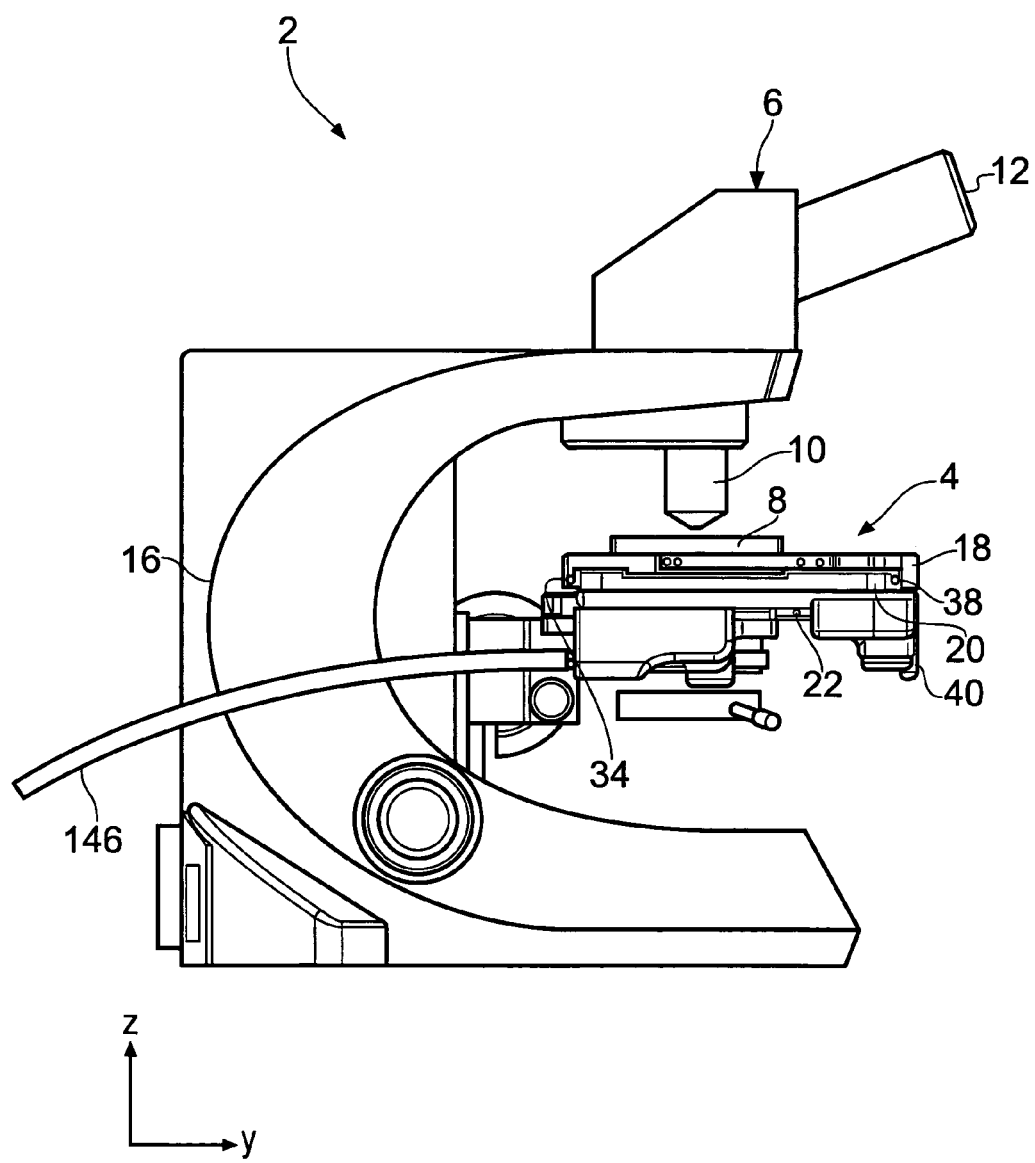
FIG. 2 is a side elevation view of the optical inspection apparatus shown in FIG. 1.
Figure 3:
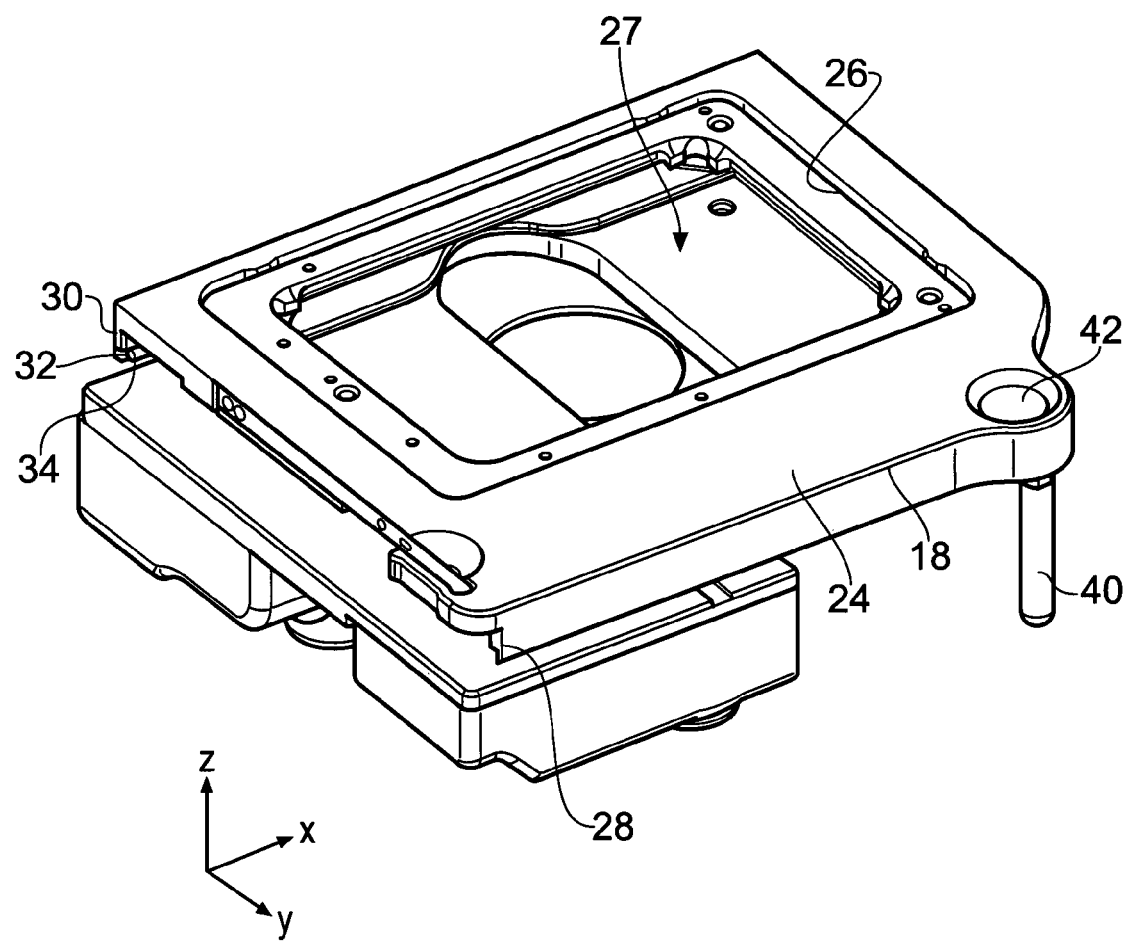
FIG. 3 is a perspective view of the plate of the sample positioning stage shown in FIG. 1.

Referring now to FIGS. 1 and 2 there is shown an optical inspection apparatus 2 which comprises a sample positioning stage 4 (hereinafter referred to as "stage") and an optical inspection device in the form of a microscope 6.

The microscope 6 comprises an objective lens 10, first 12 and second 14 eye piece lenses, and an arm 16 which supports the sample positioning stage 4.

As will be understood, the optical inspection device need not necessarily be a microscope, and can be any device suitable for examining a sample 8 placed on the stage 4. For instance, the examination device could be a spectroscope. Furthermore, it will be understood that there need not be an optical inspection device at all. For example, the stage 4 could be used to support a sample 8 which is to be examined by the naked eye.

Referring in particular to FIGS. 2 to 5, the stage comprises a plate 18, a first carriage 20 and a second carriage 22. As will be understood, the sample positioning stage 4 will typically be configured such that the plate 18 is oriented horizontally.

The second carriage 22 is fixed relative to the microscope 6, and in particular is fixed relative to the objective lens 10, in the X and Y dimensions.

The plate 18 has an upper face 24 which is substantially planar and substantially rectangular in shape. In the embodiment described, a formation in the form of a recessed area 26 is provided for receiving a sample 8 to be examined. Also provided is an aperture 27 through so that a light source (not shown) located below the plate 18 can illuminate a sample 8 located in the recessed area 26. First 28 and second 30 skirts depend from opposing sides of the plate 18.

A handle 40, which is substantially cylindrical in shape, depends from one corner of the plate 18. The handle 40 is placed on the side of the plate 18 that is distal to the arm 16. This aids accessibility of the handle 40. A recess 42 is provided in the upper face 24 of the plate 18 for receiving a thumb of a user. The handle 40 and recess 42 facilitate gripping of the plate 18 by a user.

Figure 4:
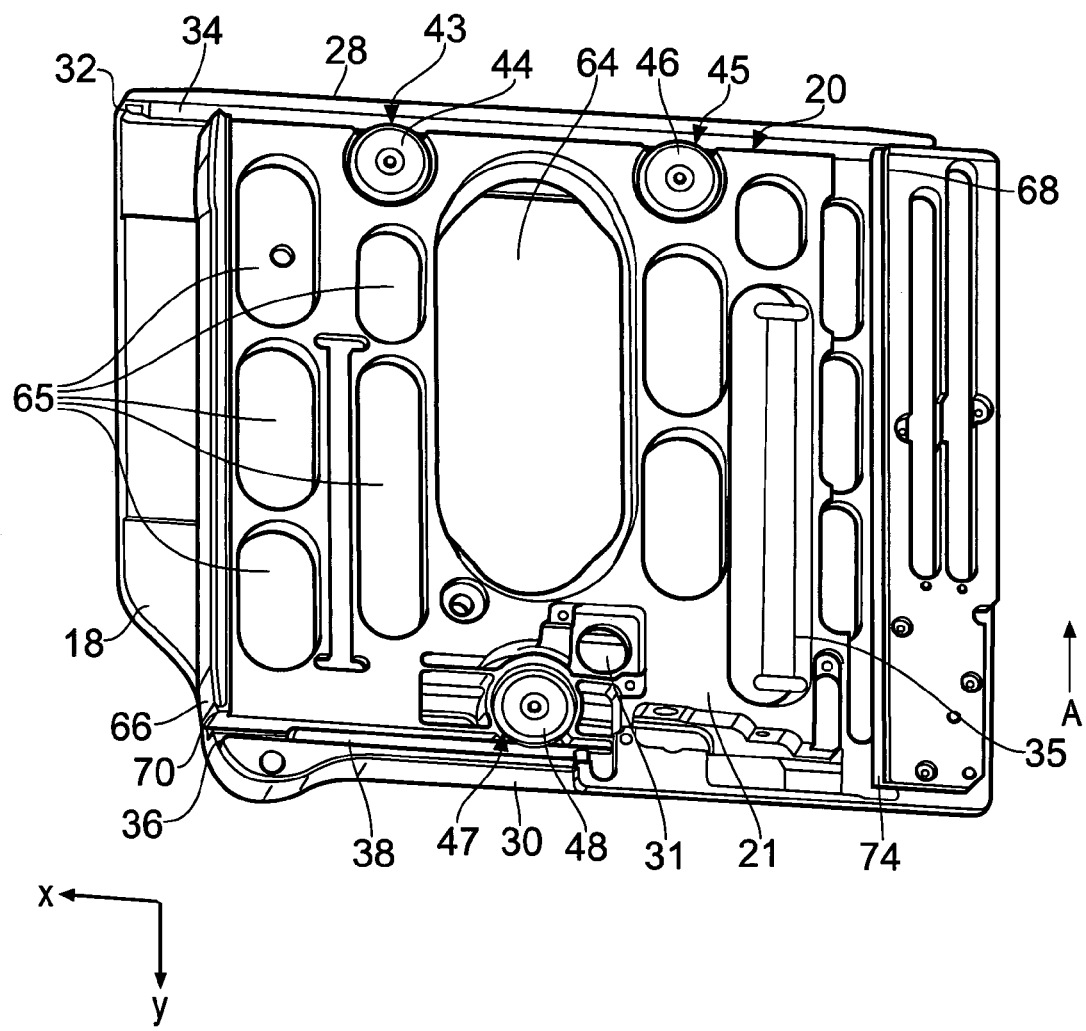
FIG. 4 is a perspective underside view of the sample positioning stage shown in FIG. 1, and shows a first carriage and the plate.
Figure 5A:
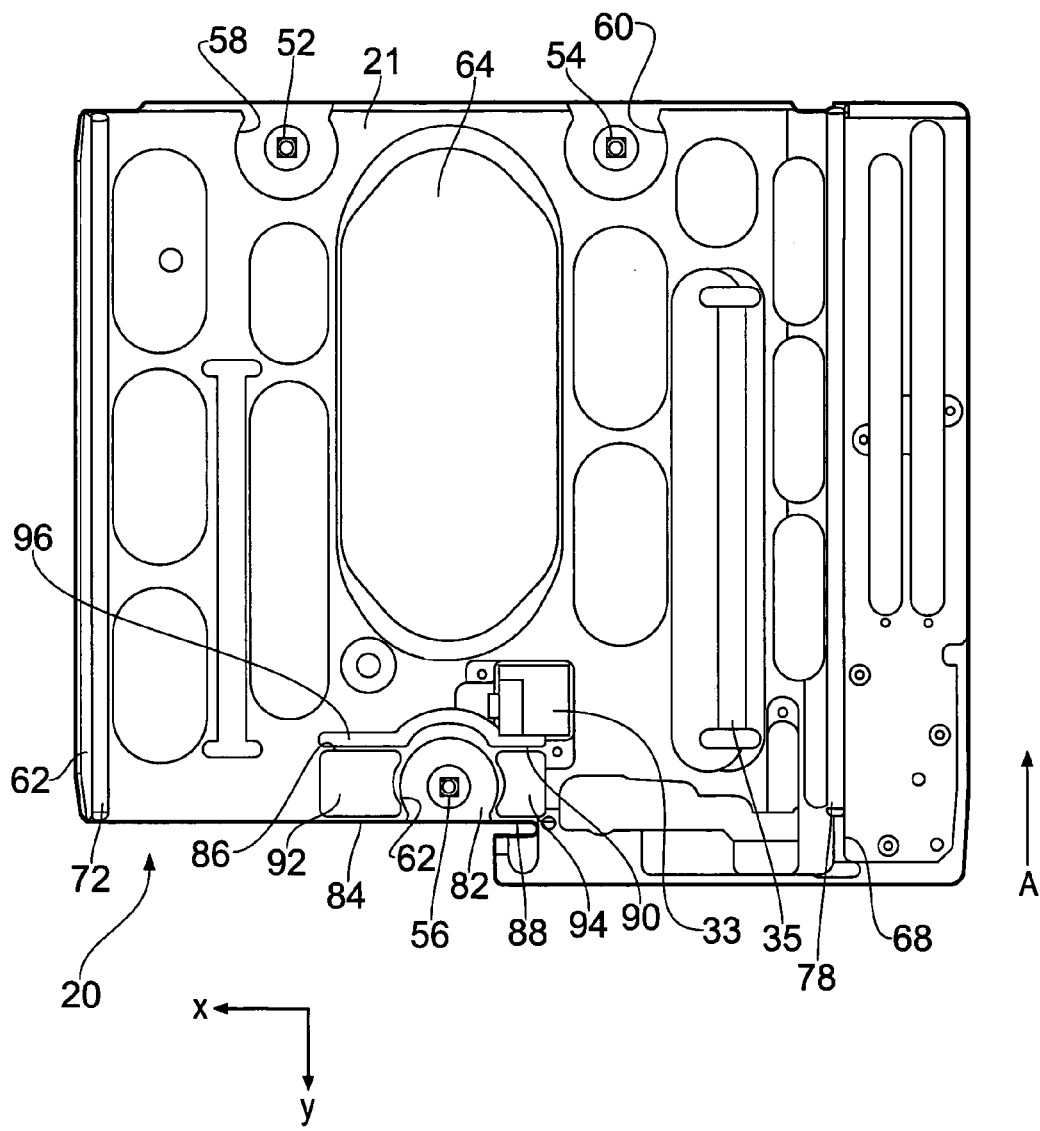
FIGS. 5a and 5b are plan and perspective views of the carriage shown in FIG. 4.
Figure 5B:
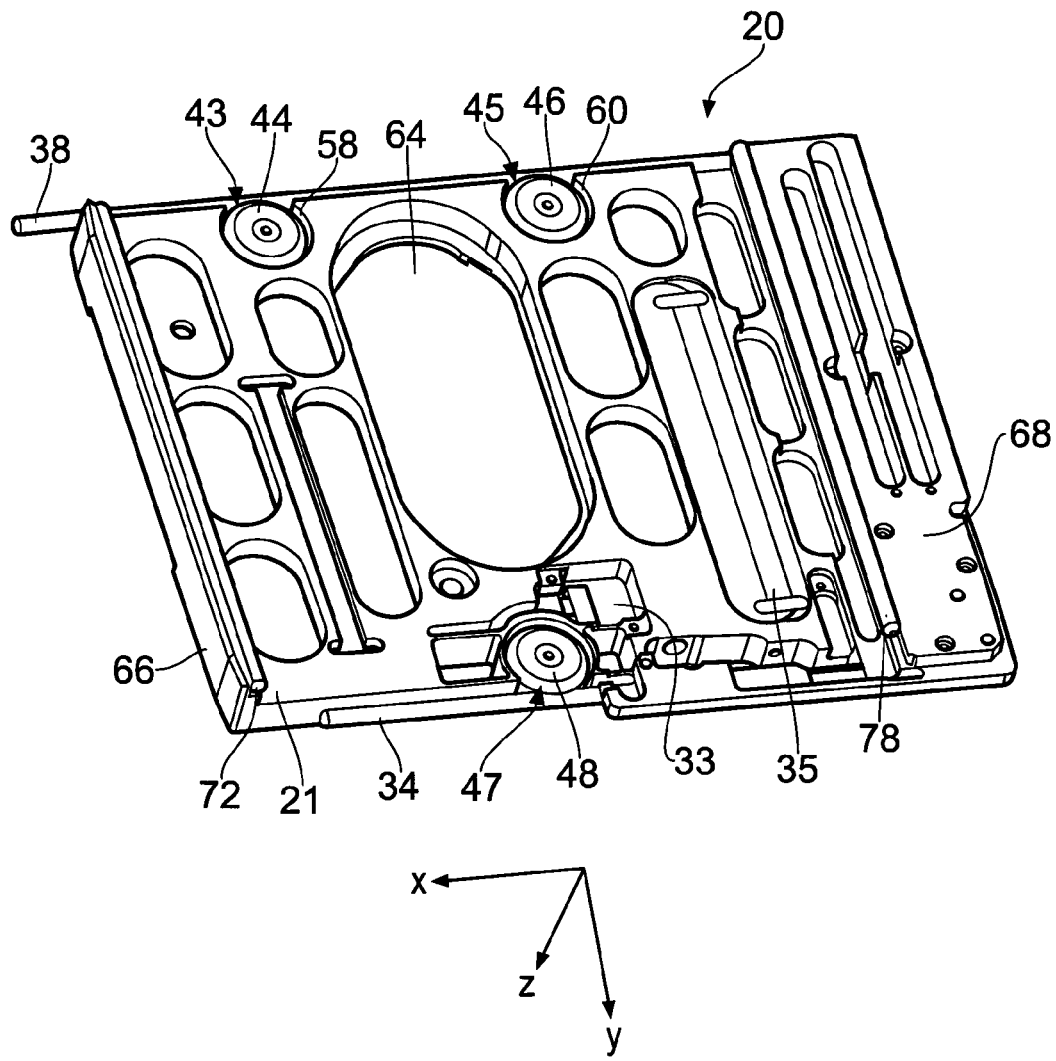

A first position measurement device is provided in the form of a first scale 31 (a part of which is shown in FIG. 4) provided on the underside of the plate 18, which can be read by a first readhead 33 (shown in FIGS. 5a and 5b) mounted on the first carriage 20. The first readhead 33 is electrically connected to a control system (not shown) via a line (not shown) in cable 146, and can output a signal which can be used by the control system to determine the position of the plate 18 relative to the first carriage 20. A suitable scale is the scale sold under product number RGS40 available from Renishaw plc. A suitable readhead for is the readhead sold under product number RGH34 readhead available from Renishaw plc.

Referring to FIGS. 4, 5 and 6a and 6b, the first carriage 20 has a body 21 which is shaped and sized so that it is a snug fit between the first 28 and second 30 skirts of the plate 18.

The body 21 of the first carriage 20 has an elongate aperture 64, and a plurality of portions of reduced depth such as those indicated by reference numeral 65. The aperture 64 allows the passage of light through the body 21 as described in more detail below, and the reduced depth portions 65 reduce the weight of the body 21.

A second position measurement device is provided in the form of a second scale 35 provided on the underside of the first carriage 20, which can be read by a second readhead 37 mounted on the second carriage 22. The second readhead 37 is electrically connected to the control system 200 via a line (not shown) in cable 146, and can output a signal which can be used by the control system 200 to determine the position of the first carriage 20 relative to the second carriage 22. A suitable scale is the scale sold under product number RGS40 available from Renishaw plc. A suitable readhead for is the readhead sold under product number RGH34 readhead available from Renishaw plc Third 66 and fourth 68 skirts depend from the body 21, and extend between the first and second sides on which the first 44, second 46 and third 48 wheels are mounted. The third skirt 66 has a third elongate recess 70 extending along its length for receiving a third guide rod 72. The fourth skirt 68 has a fourth elongate recess 74 extending along its length for receiving a fourth guide rod 76. The third 74 and fourth 78 guide rods are held within the third 70 and fourth 74 elongate recesses.

First and second rigid bearings, generally indicated by 43 and 45, are provided between the plate 18 and the first carriage 20 one side of the stage 4. A first resiliently compliant bearing generally indicated by 47, is provided between the plate 18 and the first carriage 20 on the opposite side of the stage 4. The bearings 43, 45 and 47 facilitate the relative movement of the plate 18 and first carriage 20 in the X-dimension.

The bearings 43, 45 and 47 are provided by cooperating bearing formations provided on the plate 18 and carriage 20, as described in more detail below.

The first skirt 28 has a first elongate recess 32 extending along its length for receiving a first guide rod 34. The first guide rod 34 provides the bearing part for the bearing formation on the plate 18 for the first 43 and second 45 rigid bearings. The second skirt 30 has a second elongate recess 36 extending along its length for receiving a second guide rod 38. The second guide rod 38 provides the bearing part for the bearing formation on the plate 18 for the first resiliently compliant bearing 47.

The first carriage 20 has first 44 and second 46 rigid wheels positioned spaced apart on a first side of the first carriage 20. The first 44 and second 46 rigid wheels provide the bearing parts for the bearing formations on the first carriage 20 for the first 43 and second 45 rigid bearings. The first carriage 20 also has a rigid third wheel 48 positioned on a second side of the first carriage 20, opposite to the first side. The rigid third wheel 48 is positioned along the length of the second side so that it lies midway between the first 44 and second 48 rigid wheels on the first side. The third rigid wheel 48 provides the bearing part for the bearing formation on the first carriage 20 for the first resiliently compliant bearing 47.

The first 44 and second 46 rigid wheels are mounted within first 58 and second 60 circular recesses in the body 21 so that a portion of them extends beyond the boundary of the body 21. This is so that when the sample positioning stage is assembled as shown in FIG. 4, the first 44 and second 46 wheels engage the first guide rod 34, thereby providing the first 43 and second 45 rigid bearings. Likewise, the third rigid wheel 48 is mounted within a third circular recess 62 in the body 21 so that a portion of the third wheel 48 extends beyond the boundary of the body 21. When the sample positioning stage is assembled, the third rigid wheel 48 engages the second guide rod 38, thereby providing the first resiliently compliant bearing 47.

The plate 18 and the first carriage 20 are configured so that when they are assembled together, the force on the wheels on the first carriage 20 and the respective guide rods on the examination plate is sufficiently low that the first carriage 20 is free to move within the plate 18 along the guide rods, but is sufficiently high that there is no play between the plate 18 and the first carriage 20 in all other dimensions.

The first 44, second 46 and third 48 rigid wheels each have circular apertures and the wheels are mounted by the apertures forming an interference fit with first 52, second 54 and third 56 square pegs within the first 58, second 60 and third 62 circular recesses. The use of circular apertures with square pegs enables an accurate and secure mount between the wheels and the pegs. The first 44, second 46 and third 48 wheels contain bearings which enable them to rotate relative to the pegs. The circumferential edge of the first 44, second 46 and third 48 rigid wheels is grooved so that the wheels can partially wrap around their respective guide rod. This prevents the wheels, and hence the carriage moving relative to the plate in the Z dimension, i.e. perpendicular to the plane of the plate 18.

The first 52 and second 54 pegs are mounted on the first carriage 20 so that they cannot be moved relative to the body 21. In contrast, the third peg 56 is mounted on the first carriage 20 so that it can resiliently move relative to the body 21 in a direction perpendicular to the length of the second guide rod 38 of the plate 18 when the sample positioning stage 4 is assembled.

Figure 10:
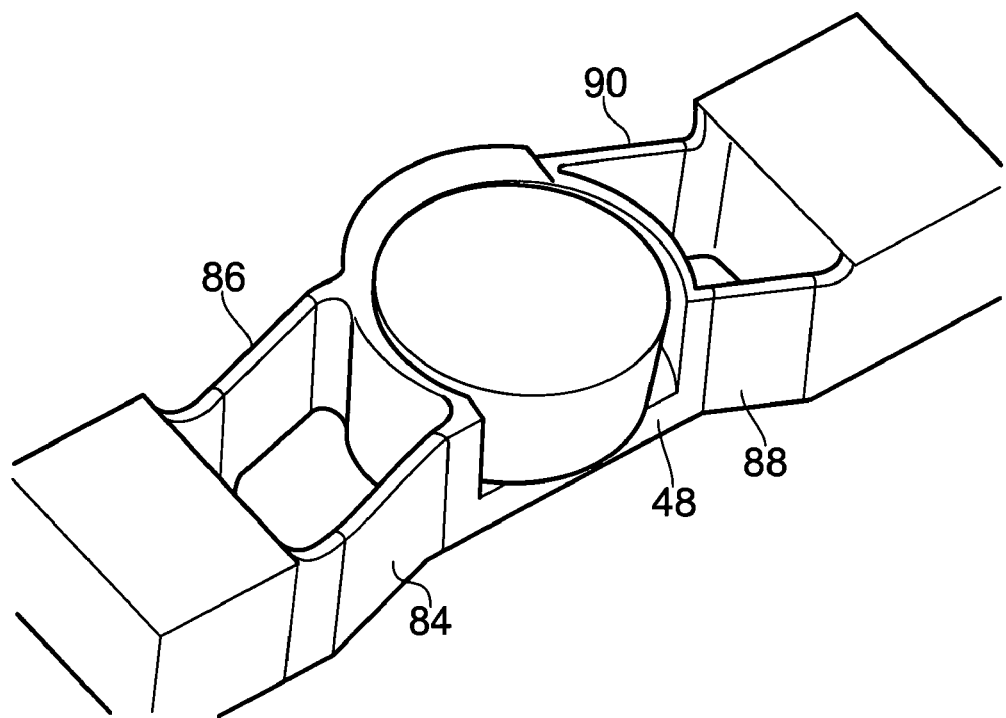
FIG. 10 illustrates the deformation of the runner mounting of a carriage of the sample positioning stage.

In particular, the third peg 56 is mounted on a planar base 82 which is connected to the body 21 by first 84, second 86, third 88 and fourth 90 arms which define first 92, second 94 and third 96 apertures. The first 84, second 86, third 88 and fourth 90 arms are resiliently deformable and allow the planar base 82, and so the peg 56 and the third wheel 48 mounted on it, to move into the body 21 in the direction indicated by arrow A, on the application of a force on the planar based 82 in the direction indicated by arrow A. The first 84, second 86, third 88 and fourth 90 arms are configured to deform along their length as illustrated in FIG. 10 (which shows an exaggeration of the amount the arms will actually deform in the described embodiment).

The stage 4 is configured such that when the plate 18 and first carriage 20 are assembled together the first 84, second 86, third 88 and fourth 90 arms are deformed. Accordingly, due to their resilience, the first 84, second 86, third 88 and fourth 90 arms will bias the third rigid wheel 48 into the second guide rod 38. This in turn will cause the first 44 and second 46 rigid wheels to be biased into the first guide rod 34.

In the described embodiment, the stage 4 is configured so that the force on the planar base 82 (caused by the force on the third wheel 48 by its engagement with the second guide rod 38) is greater than the yield stress of the first 84, second 86, third 88 and fourth 90 arms. Accordingly, the first 84, second 86, third 88 and fourth 90 arms are plastically deformed on assembly of the plate 18 and the first carriage 20.

Figure 6A:
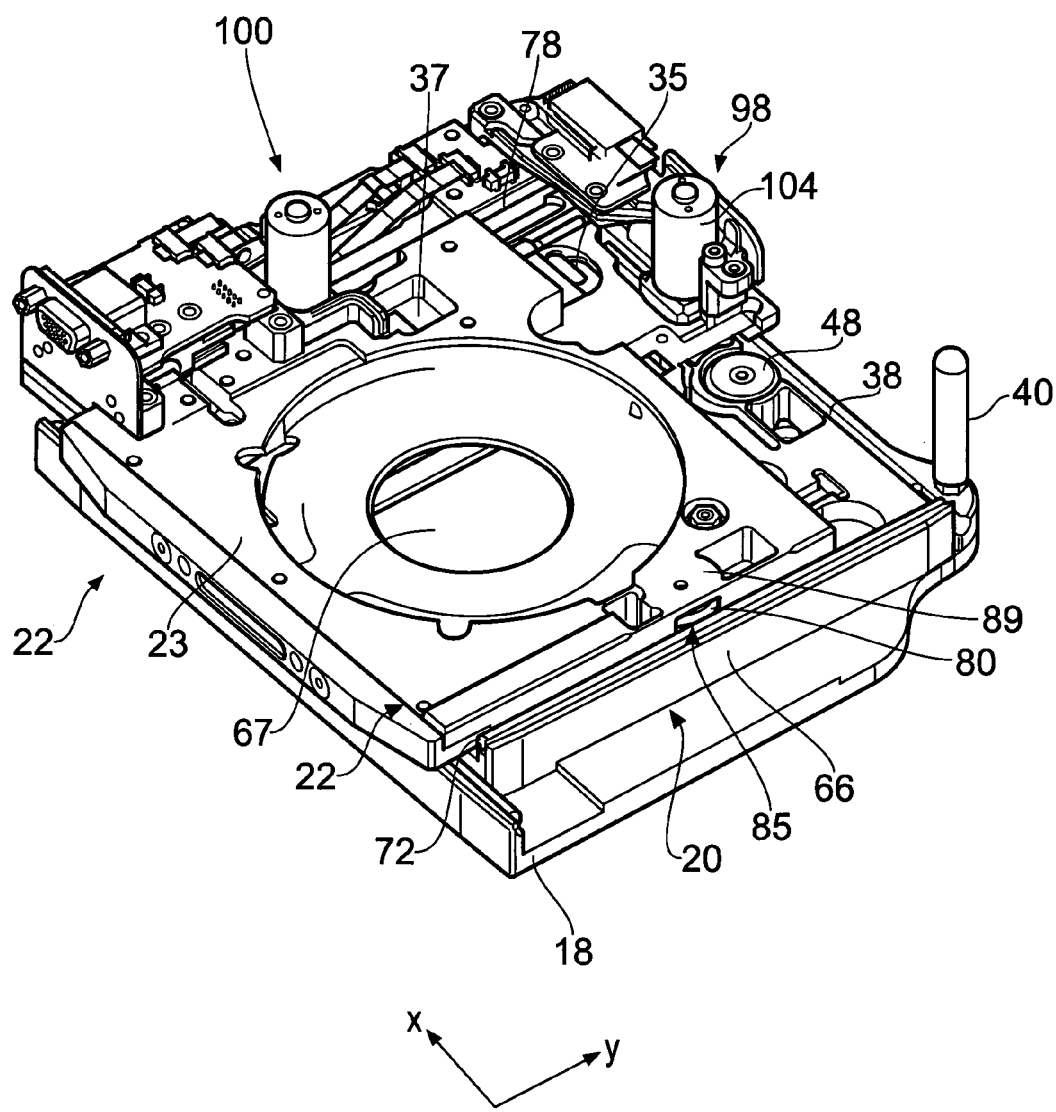
FIG. 6a is a perspective underside view of the sample positioning stage shown in FIG. 1, and shows the first and a second carriage and the plate.
Figure 6B:
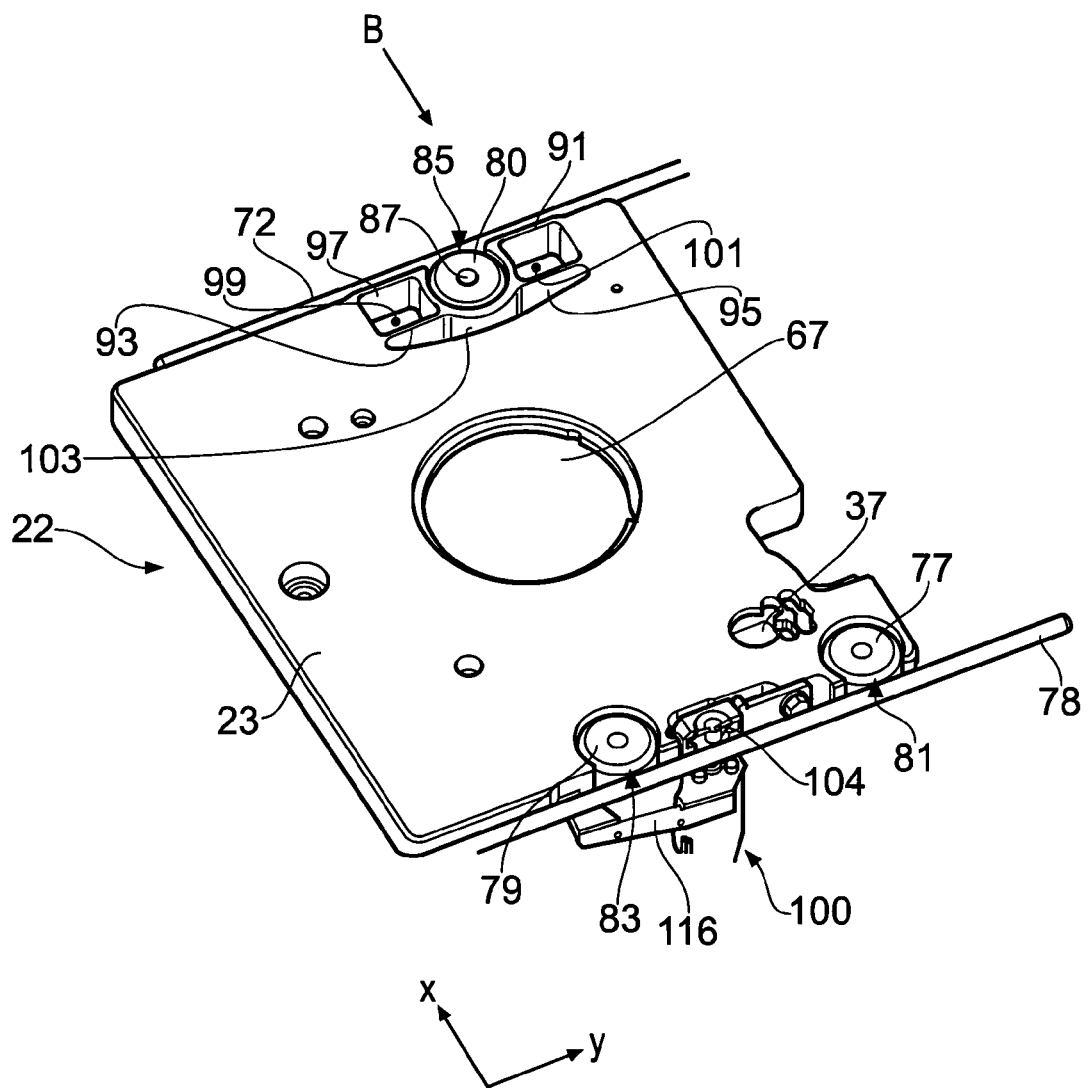
FIG. 6b is a perspective topside view of the second carriage in isolation.
Figure 7:
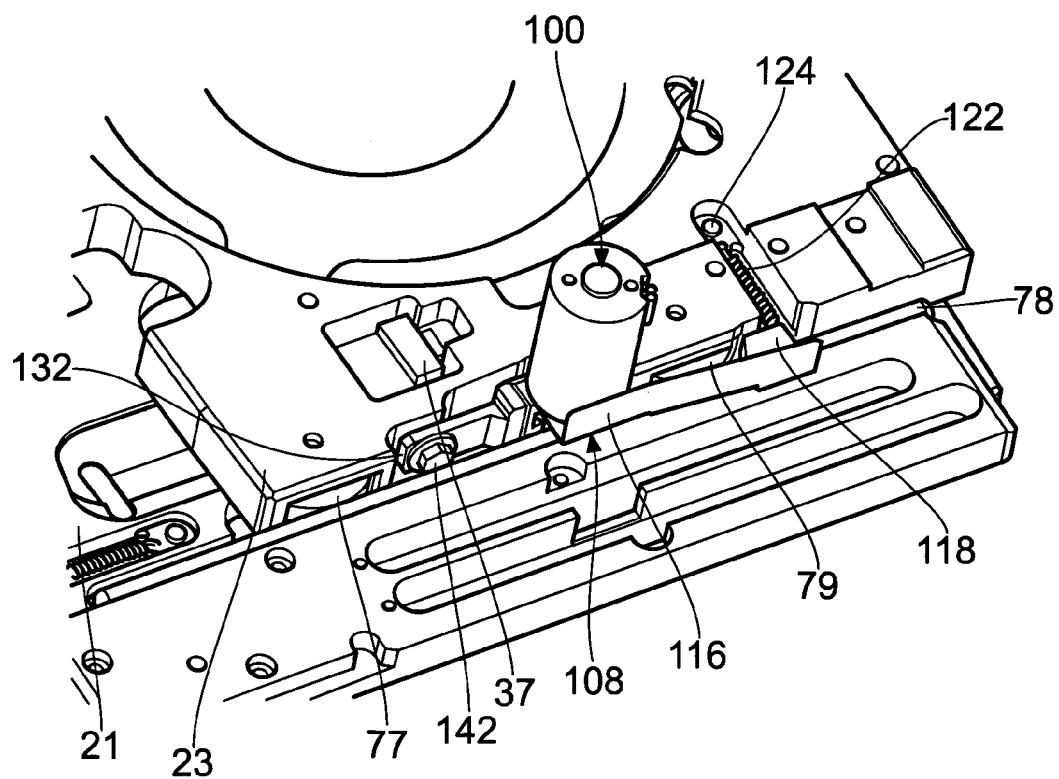
FIG. 7 is a detail view of a drive mechanism mounted within the sample positioning stage shown in FIG. 1.

Referring to FIGS. 6a, 6b and 7, the second carriage 22 has a body 23 which is shaped and sized so that it is a snug fit between the third 66 and fourth 68 skirts of the first carriage 20. The second carriage 22 is substantially identical to the first carriage 20, apart from that the shape of the aperture 67 (which allows the passage of light through the second carriage 22 as described in more detail below) is circular rather than elongate. This is possible because the second carriage 22 will be fixed relative to a light source, whereas the first carriage 20 will be able to move relative to the first carriage 20 in the Y dimension.

Third and fourth rigid bearings, generally indicated by 81 and 83, are provided between the first carriage 20 and the second carriage 22 on one side of the stage 4. A second resiliently compliant bearing generally indicated by 85, is provided between the first carriage 20 and the second carriage 22 on the side of the stage 4 opposite to that on which the third 81 and fourth 83 rigid bearings are provided. The bearings 81, 83 and 85 facilitate the relative movement of the first carriage 20 and second carriage 22 in the Y-dimension.

The bearings 81, 83 and 85 are provided by cooperating bearing formations provided on the first carriage 20 and second carriage 22, as described in more detail below.

The fourth guide rod 78 provided on the first carriage 20 provides the bearing part for the bearing formation on the first carriage for the third 81 and fourth 83 rigid bearings. The third guide rod 72 provided on the first carriage 20 provides the bearing part for the bearing formation on the first carriage 20 for the second resiliently compliant bearing 85.

As with the first carriage 20, the second carriage 22 has first 77 and second 79 rigid wheels which are positioned spaced apart on a first side of the second carriage 22. The first 77 and second 79 rigid wheels provide the bearing parts for the bearing formations on the second carriage 22 for the third 81 and second 83 rigid bearings. The second carriage 22 also has a third rigid wheel 80 positioned on a second side of the second carriage 22, opposite to the first side. The rigid third wheel 80 is positioned along the length of the second side so that it lies midway between the first 77 and second 79 rigid wheels on the first side. The rigid third wheel 80 provides the bearing part for the bearing formation on the second carriage 22 for the third resiliently compliant bearing 85.

The first carriage 20 and the second carriage 22 are configured so that when they are assembled together, the force on the wheels on the second carriage 22 and the respective guide rods on the first carriage 20 is sufficiently low that the second carriage 22 is free to move within the first carriage 20 along the guide rods, but is sufficiently high that there is no play between the first carriage 20 and the second carriage 22 in the other dimensions.

The first 77 and second 79 rigid wheels are mounted on the second carriage 22 so that they cannot be moved relative to the body 23. In contrast, the rigid third wheel 80 is mounted on the second carriage 22 so that it can move relative to the body 23 in a direction perpendicular to the length of the fourth guide rod 72 of the plate 18 when the sample positioning stage 4 is assembled.

In particular, the rigid third wheel 80 is mounted via a peg 87 which in turn is mounted on a planar base 89 which is connected to the body 23 by first 91, second 93, third 95 and fourth 97 arms which define first 99, second 101 and third 103 apertures. The first 91, second 93, third 95 and fourth 97 arms are resiliently deformable along their length and allow the planar base 89, and so the peg 87 and the third wheel 80 mounted on it, to move into the body 23 in the direction indicated by arrow B, on the application of a force on the planar base 89 in the direction indicated by arrow B.

The stage 4 is configured such that when the first carriage 20 and second carriage 22 are assembled together the first 91, second 93, third 95 and fourth 97 arms are deformed. Accordingly, due to their resilience, the first 91, second 93, third 95 and fourth 97 arms will bias the third rigid wheel 80 into the third guide rod 72. This in turn will cause the first 77 and second 79 rigid wheels to be biased into the fourth guide rod 78.

In the described embodiment, the stage 4 is configured so that the force on the planar base 89 (caused by the force on the rigid third wheel 80 by its engagement with the third guide rod 72) is greater than the yield stress of the first 91, second 93, third 95 and fourth 97 arms. Accordingly, the first 91, second 93, third 95 and fourth 97 arms are plastically deformed on assembly of the first carriage 20 and second carriage 22.

Referring to FIGS. 6*a*, 6*b* and 7, a first drive unit 98 for driving the first carriage 20 relative to the sample positioning stage in the X dimension, is mounted on the first carriage 20 adjacent the first carriage's third wheel 48 and frictionally engages the second guide rod 38. A second drive unit 100 for driving the second carriage 22 relative to the first carriage 20 in the Y dimension, is mounted on the second carriage 22 between the second carriage's first 77 and second 79 wheels and frictionally engages the fourth guide rod 78. The first 98 and second 100 drive units are identical.

It has been found that providing the drive unit and the position measurement devices on the side on which the rigid bearings are located improves the accuracy and repeatability of the stage positioning. FIG. 14 shows an embodiment of a stage 1004 which is substantially identical to the stage 4 described in connection with FIGS. 1 to 13 and like items share like reference numerals. However, rather than the first 98 drive unit which provides for relative movement between the plate 18 and the first carriage being on the side of the resiliently compliant bearing (not shown) it is located on the side of the rigid bearings (of which only the first rigid bearing 43 is visible the second rigid bearing being obscured from view). As is the case with the stage 4 described in connection with FIGS. 1 to 13, the second drive unit 100 which provides for relative movement between the first carriage 20 the second carriage 22 is still provided on the side of the rigid bearings (of which only first rigid bearing 83 is visible).

Figure 8A:
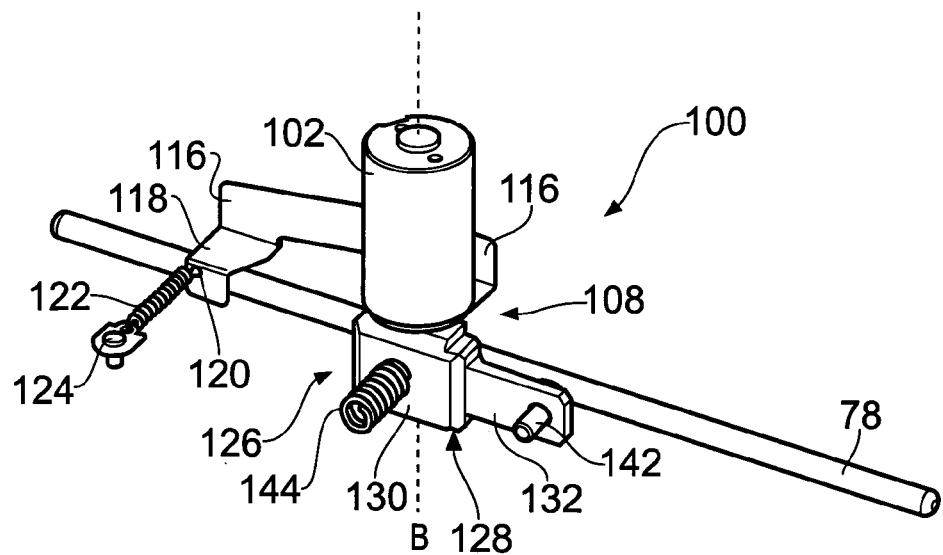
FIGS. 8a and 8b are perspective views of the drive mechanism shown in FIG. 7.
Figure 8B:
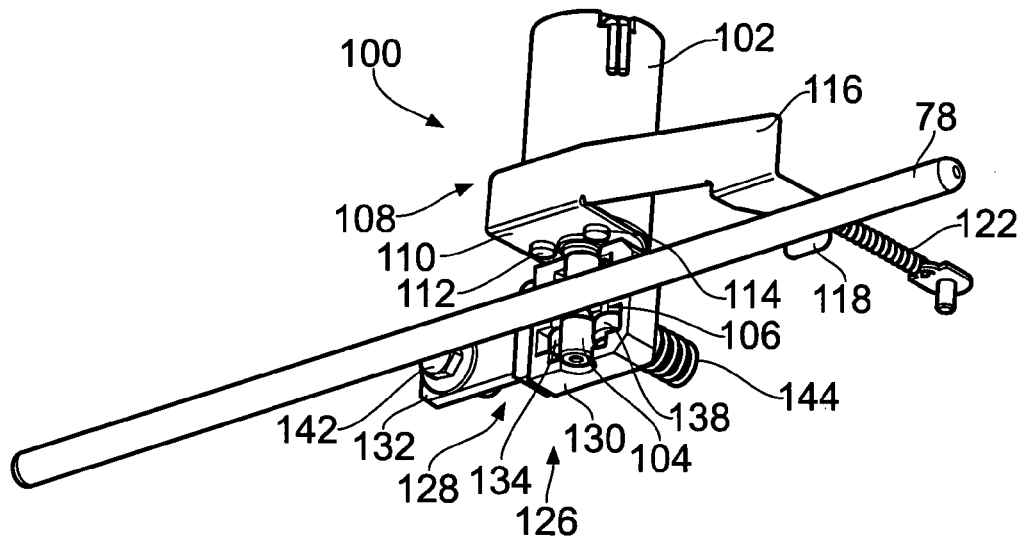
Figure 9:
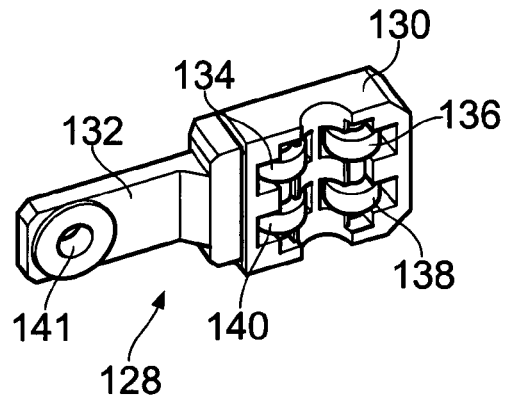
FIG. 9 is a perspective view of a bearing member of the drive mechanism shown in FIG. 7.

Referring to FIGS. 7 to 9, the second drive unit 100 comprises a motor body 102 and a drive shaft 104 extending from the motor body 102 which can be rotated by the motor body 102. The motor body 102 is a 12 volt DC direct drive motor. The motor body 102 receives power from a power source (not shown) through electrical cables (not shown).

Figure 15:
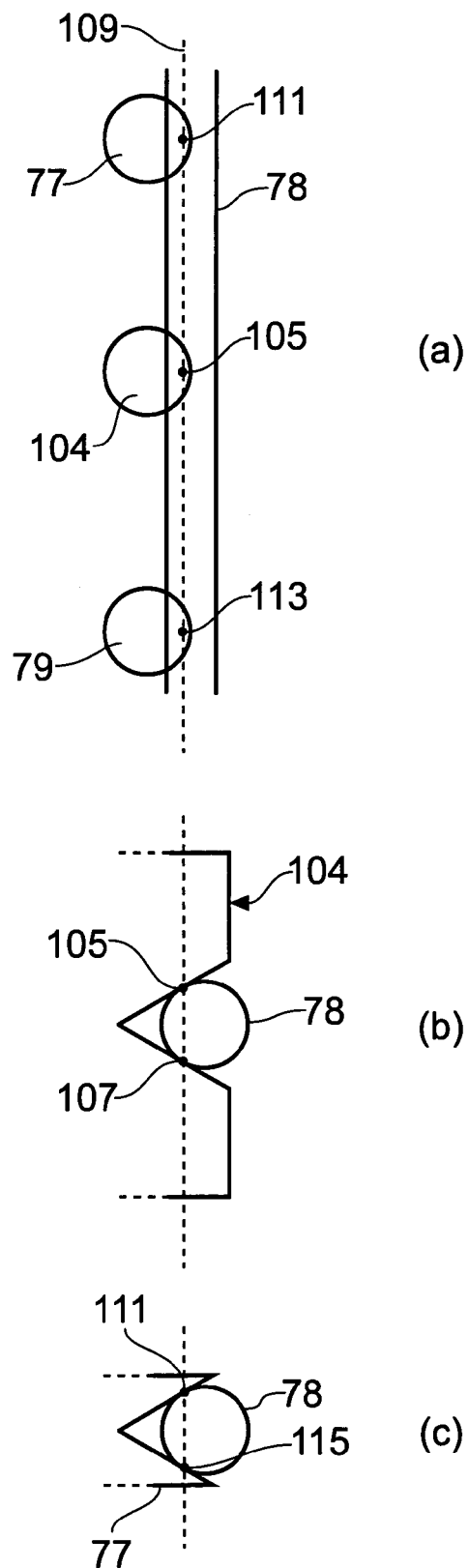

The drive shaft 104 has first 106 and second (not shown) conical portions which each converge to a reduced diameter portion toward the centre of the length of the drive shaft. When the sample positioning stage 4 is assembled, both of the first 106 and second conical portions contact the fourth guide rod 78. Accordingly, the drive shaft 104 has two points of contact with the guide rod 78. As illustrated in FIGS. 15*a* to 15*c* the first 105 and second 107 points of contact each lie on a bearing contact plane illustrated by dashed line 109 which the contains the points of contact between the second carriage's 22 first 77 and second 79 wheels and the fourth guide rod 78. In particular, the point of contact 105 between the drive shaft 104 and the lower side of the guide rod 78 lies on a lower bearing contact line which contains the point of contact 111 between the first wheel 77 and the lower side of the guide rod and the point of contact 113 between the second wheel 79 and the lower side of the guide rod 113. Furthermore, the point of contact 107 between the drive shaft 104 and the upper side of the guide rod 78 lies on an upper bearing contact line which contains the point of contact 115 between the first wheel 77 and the upper side of the guide rod and the point of contact (not shown) between the second wheel 79 and the upper side of the guide rod 113.

The second drive unit 100 comprises a mounting arm 108. The motor body 102 is secured to the mounting arm so that they cannot move relative to each other. The mounting arm 108 has a base portion 110 to which the motor body 102 is secured by first 112 and second 114 screws, and an arm portion 116 which extends away from the motor body 102 along the length of the fourth guide rod 78. The end of the arm portion 116 distal to the motor body 102 has an extension 118 which defines an aperture 120.

The mounting arm 108 is mounted on the second carriage 22 via a spring 122. The spring 122 is secured to the second carriage 22 via a screw 124, and to the mounting arm 108 by the end of the spring being hooked through the aperture 120. Accordingly, in this way the mounting arm 108 is mounted on the second carriage so that the mounting arm 108, and hence the motor body 102 and drive shaft 104, is free to move relative to the second carriage in all dimensions other than in the dimension defined by the rotational axis B of the drive shaft 104. Rotation of the mounting arm 108, and hence the motor body 102 and drive shaft 104, is restricted in a first direction by the spring 122 and in a second direction opposite to the first direction by the abutment of the extension 118 against the body 23 of the second carriage 22.

The second drive unit 100 further comprises a bias mechanism 126 for biasing the drive shaft 104 onto the fourth guide rod 78. The bias mechanism 126 comprises a body 128 which has a head 130 and an arm 132, and a spring 144 which, when the sample positioning stage 4 is assembled, acts between the head 130 and the body 23 of the second carriage 22.

The head 130 has first 134, second 136, third 138 and fourth 140 bearings. When the sample positioning stage 4 is assembled, the bearings engage the drive shaft 104 and facilitate rotation of the drive shaft 104 relative to the head 130.

A first end of the arm 132 is secured to the head 130, and the arm 132 has an aperture 141 toward its second end which is distal to the head 130. The bias mechanism 126 is coupled to the body 23 via a bolt 142 which extends through the aperture 140 in the arm 132 and which engages a threaded bore in the body 23. The arm 132 is flexible so that the head 130 can be biased onto the second guide rod 78 by the spring 144.

To assemble the sample positioning stage 4, the first carriage 20 is slid into the plate 18 so that the first 44 and second 46 wheels engage the first guide rod 34, and so that the third wheel 48, and the drive shaft 104 of the first drive unit 98 (which is mounted on the first carriage 20 in the manner described above) engage the second guide rod 38.

The dimensions of the plate 18 and first carriage 20 are such that in order for the first carriage 20 to be received within the plate 18, the first 84, second 86, third 88 and fourth 90 arms are deformed so that the third wheel 48 is compressed into the body 21 of the first carriage 20. Furthermore, in the embodiment described the first 84, second 86, third 88 and fourth 90 arms are deformed to such an extent so as to plastically deform the first 84, second 86, third 88 and fourth 90 arms. Accordingly, when the first carriage 20 is received in the plate 18, the first 84, second 86, third 88 and fourth 90 arms bias the third wheel 48 onto the second guide rod 38.

Furthermore, the spring 144 is compressed by the interaction between the drive shaft 104 of the first drive unit 98 with the second guide rod 38 of the plate 18, so that the drive shaft 104 is biased onto the second guide rod 38.

The second carriage 22 is then slid into the first carriage 20 in a manner similar to that described above in relation to the first carriage 20 and the plate 18.

The second carriage 22 is then fixed to the microscope 6 so that it cannot move relative to the objective lens 10 in the X and Y dimensions. Accordingly, the position of the plate 18 can be moved relative to the objective lens 10, in the X dimension by operation of the first drive system 98, and in the Y dimension by operation of the second drive system.

A light source (not shown) can be positioned below the sample positioning stage 4. Light from the light source can pass through the aperture 67 in the second carriage 22, the aperture 65 in the first carriage and the aperture 27 in the plate 18 so as to illuminate a sample 8 located on the plate 18.

Figure 11:
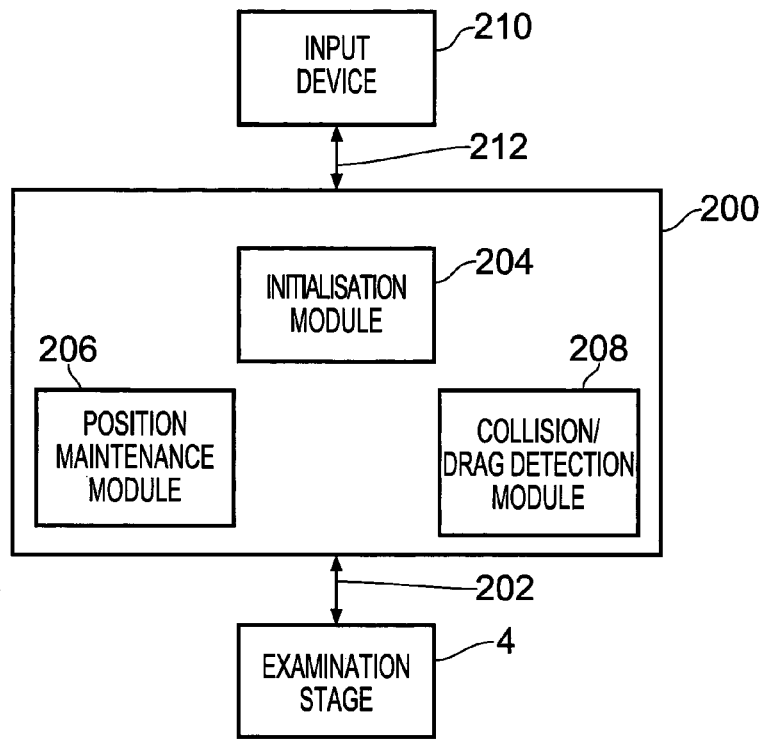
FIG. 11 is a schematic diagram of a control system and input device coupled to a sample positioning stage according to the present invention.

As shown in FIG. 11, the sample positioning stage 4 is connected to a control system 200 via an input/output line 202 (in cable 146). The control system 202, comprises an initialisation module 204, a position maintenance module (PMM) 206 and a collision/drag detection module 208. The control system 200 is connected to an input device 210 via input/output line 212.

The basic operation of the control system 200 will now be described in connection with FIG. 12. The position maintenance module 206 begins at step 300, when the control system 200 is first turned on. On startup, the position maintenance module 206 performs an initialisation process at step 302. This involves calling a calibration routine from the initialisation module 204 which calibrates the sample positioning stage 4. On completion of the calibration routine, the position maintenance module 206 receives the current position of the plate 18 relative to the first carriage 20 in the X dimension, and the current position of the first carriage 20 (and hence the plate 18) relative to the second carriage 22 in the Y dimension, and puts this data into a current position variable. Also as part of the initialisation process 302, the position maintenance module 206 sets up a demanded position variable with its initial value being the same as the current position variable.

The demanded position variable can be changed by a user inputting a new demanded position via the input device 210. In particular, the user can input a demanded X position and a demanded Y position to the control system via the input device 210. In the described embodiment, the user inputs an absolute demanded position (i.e. move the plate 18 to a certain X/Y position). However, it will be understood that the demanded position input to the control system 200 can be a relative position (i.e. move the plate 18 in the X/Y dimension by a certain amount).

The position maintenance module continually monitors the output from the first 33 and second 37 readheads and updates the current position variable on detection of a change of position.

At step 304, the position maintenance module 206 continually checks to see if the demanded position and the current position are the same. If not, then at step 306, the position maintenance module applies a DC output voltage ("V") across either, or both, of the motor bodies 102 of the first 98 and second 100 drive systems as required so as to move the plate 18 toward the demanded position. The output voltage V can be increased up to a maximum output voltage so as to progress the plate 18 towards the demanded position. As the plate 18 is moved, the current position variable is continually updated so as to reflect its current actual position. This process continues until the current position variable is the same as the demanded position variable.

The user can manually drag the plate 18 by applying a force to the plate 18 in the X and/or Y dimension. The user can apply such a force to the plate 18 by manipulating the handle 40.

The collision/drag detection module 208 runs in parallel to the position maintenance module 206, and is used to determine if the plate 18 is being manually dragged by the user, or if the plate 18 has collided with an object. If the collision/drag detection module 208 does detect such a situation, then it deactivates the motor bodies 102 of one of, or both of, the first 98 and second 100 drive systems so as to stop them driving against the external force. The operation of the collision/drag detection module 208 is explained in connection with FIG. 13.

The collision/drag detection module 208 begins at step 500 when the control system 200 is turned on. At step 502, the output voltage V applied by the position maintenance module 206 at step 306, is continually monitored to see if it is at its maximum level.

Figure 12:
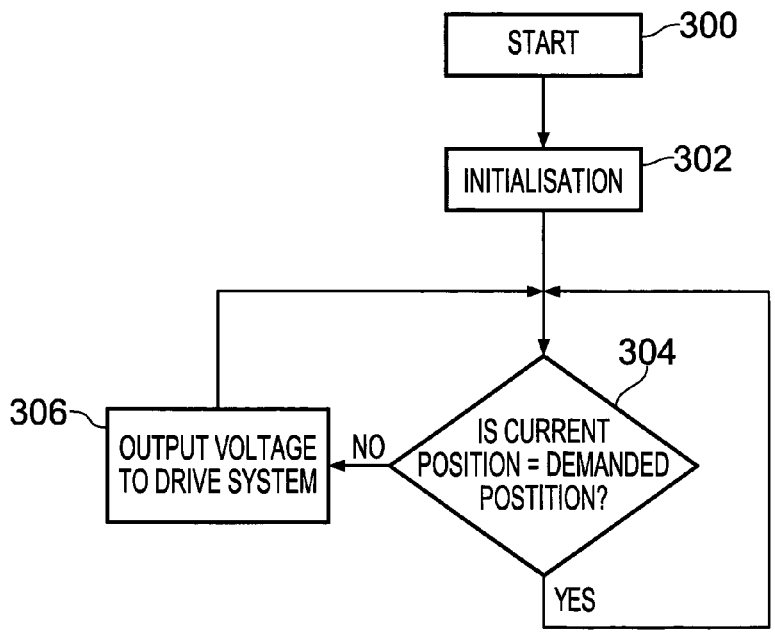
FIG. 12 is a flow chart showing the method of operation of the position maintenance module of the control system shown in FIG. 11.

As can be seen from FIG. 12, when the plate 18 collides with an object, or is manually dragged away from the demanded position, the position maintenance module will attempt to oppose the collision/dragging by increasing the output voltage ("V") applied to the motor body 102 of either or both of the first 98 and second 100 drive units to full power so as to bring the current position closer to the demanded position. Accordingly, the output voltage V will only be at its maximum level when the current position is not the same as the demanded position.

If the output voltage V is at is maximum voltage, then the process proceeds to step 504. At step 504, the position error is recorded in a variable PositionError0 and a timer ("t") is started. The position error is the difference between the demanded position and the current position.

Control proceeds to step 506 in which the timer is continually incremented until it has reached half its maximum value ("T"). In the described embodiment, "T" is 25 mS. Accordingly, after approximately 12.5 mS, it is determined if the output voltage V is still at is maximum level. If the output voltage V is not still at its maximum level then this means that the external force on the plate 18 has been removed and so the process restarts.

If the output V is still at its maximum level, then control proceeds to step 508 at which the current position error is recorded in a variable PositionError1.

At 510, the timer t is continually incremented until it has reached its maximum value T. Accordingly, after approximately 25 mS from the start of the timer t, it is determined if the output voltage V is still at is maximum level. If the output voltage V is not still at its maximum level then this means that the external force on the plate 18 has been removed and so the process restarts.

If the output voltage V is still at its maximum level, then control proceeds to step 512 at which the current position error is recorded in a variable PositionError2.

At 514, it is determined if a force external to the plate 18 is being applied to it. If the sample positioning stage 4 has collided with an object and stalled, then the position of the plate 18 between the timer t being started and the timer t reaching the maximum number of increments T will not have changed significantly. Accordingly, if the difference between the position in PositionError0 and the position in PositionError2 is smaller than a predetermined maximum movement threshold X, then the method proceeds to step 518. The predetermined maximum movement threshold X enables a collision still to be detected even if the plate 18 moves a small distance between the recordal of PositionError0 and PositionError2. In the described embodiment, the predetermined threshold X is 100 μm.

If at step 514 the method does not determine that the plate 18 has collided with an object, then the method proceeds to step 516 at which it is determined if the plate 18 is being dragged manually.

At step 514, it is determined if either of the following are true:
0>PositionError0>PositionError1>PositionError2
0<PositionError0<PositionError1<PositionError2

These conditions are true whenever the plate 18 is being dragged away from its demanded position. If either of these conditions are true, then the process proceeds to step 518. If neither of these conditions are true, then the process returns to step 502.

At step 518 the motor body 102 is turned off. This is done by the collision/drag detection module 208 interrupting the position maintenance module 206 and reducing the DC output voltage V applied across the drive unit to zero. Accordingly, the motor body 102 will no longer try to drive the plate 18 to the demanded position and the drive unit 100 can be easily backdriven by the user.

Control then proceeds to step 520 in which a timer Voff is started. Timer Voff has a maximum value of one second. At step 522, it is determined if the plate 18 is stationary. If the examination plate is not stationary, then control returns to step 520, and the Voff timer is reset to zero.

If it is determined that the plate 18 is stationary, then control proceeds to step 526 at which it is determined if Voff has reached its maximum value (i.e. one second). If not, then control returns back to step 522 and the process is configured so that step 524 executes once every 200 μS after the timer Voff is started. If Voff has reached its maximum value, (i.e. one second) then control proceeds to step 528, at which point the demanded position variable is set as being the current position, and the position maintenance module 206 is restarted (from step 304).

Figure 13:
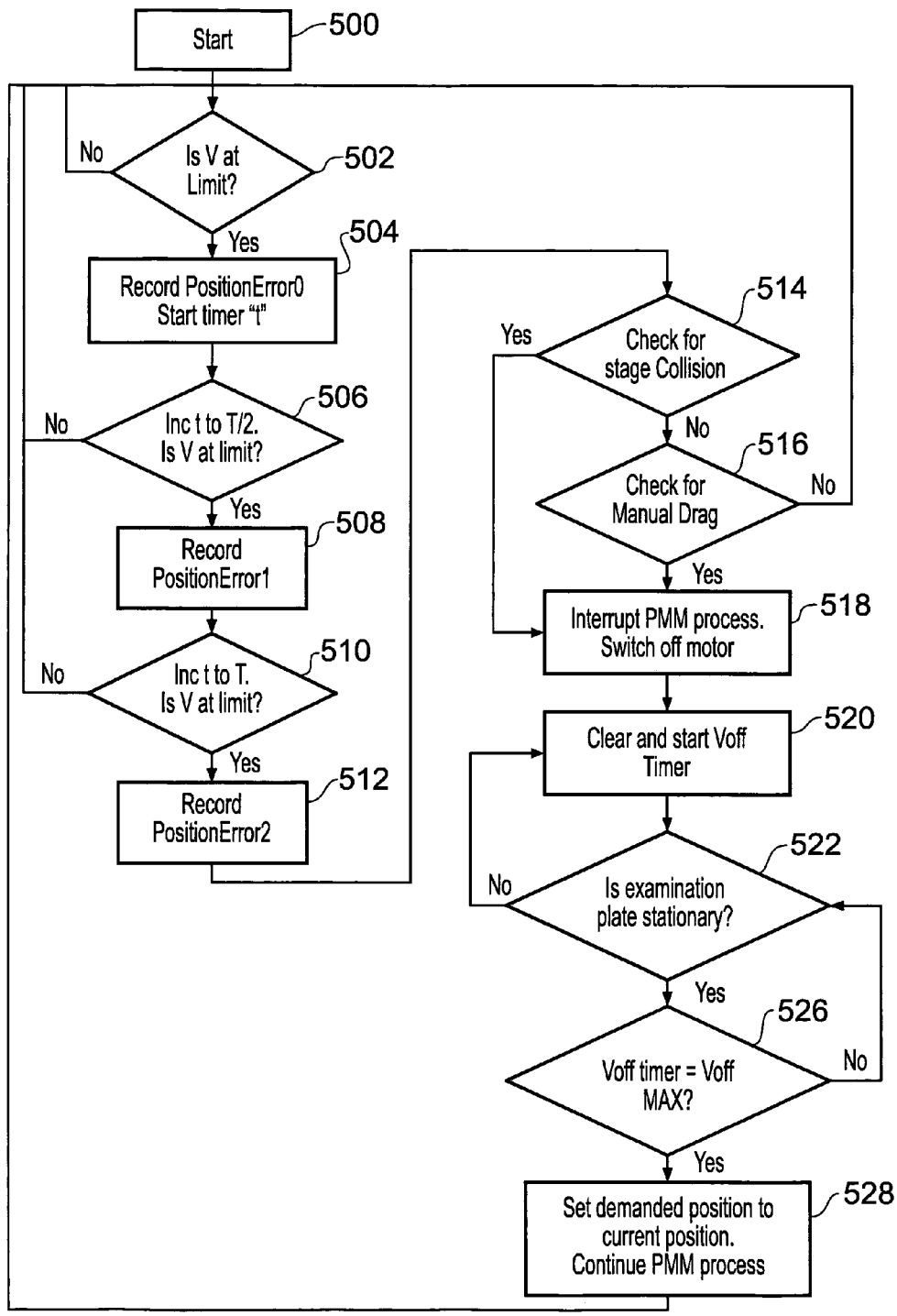
FIG. 13 is a flow chart showing the method of operation of the collision/drag detection module of the control system shown in FIG. 11.
Figure 14:
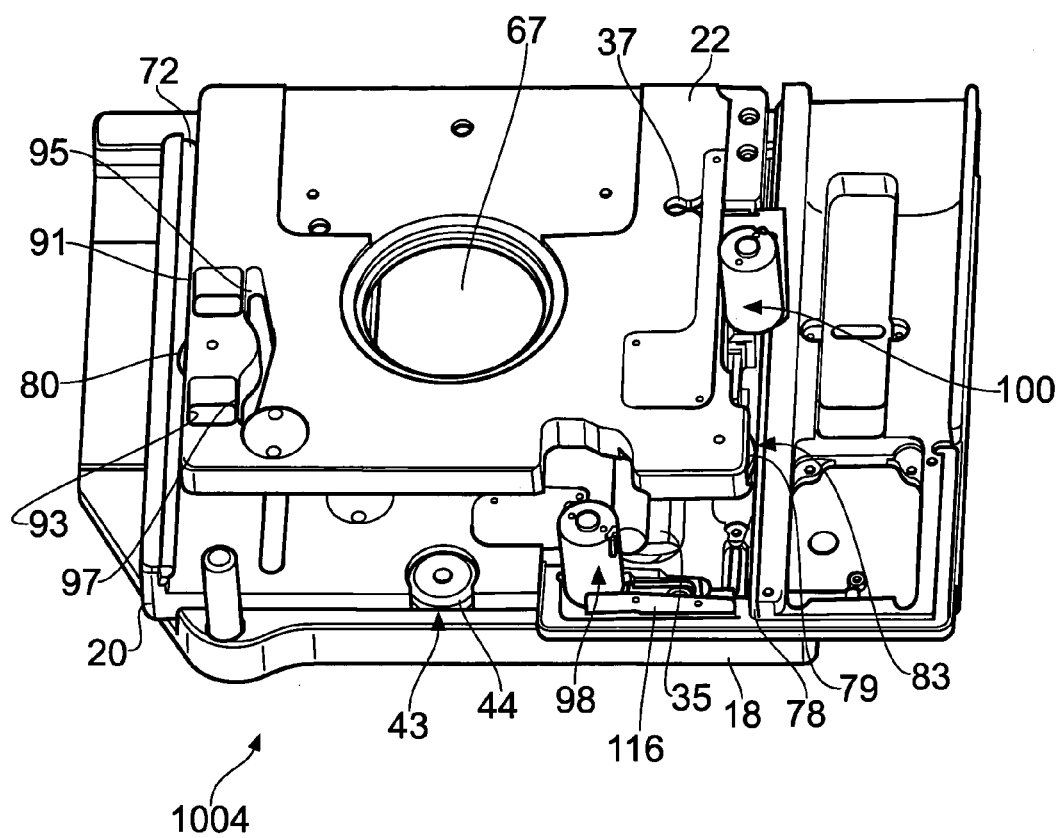
FIG. 14 is a perspective underside view of a second embodiment of a sample positioning stage according to the invention.

The process described in relation to FIG. 13 is executed in connection with each of the first 98 and second 100 drive units independently.

As will be understood, other mechanisms other than the above described method can be used to determine when to the turn the motors 100 and 104 off so as to not to drive the plate 18 to a demanded position against an external force. For instance, a switch could be provided on the stage 4 for enabling the user to switch the mode of operation between one mode in which it drive tries to drive the plate 18 to a demanded position and another mode in which it freely allows a user to backdrive the drive units 98 and 100 so as to manually position the plate 18. Such a switch could be provided, for example by a button on the stage 4. For example, the button could be placed in the location of the recess 42 on the plate 18.

The invention claimed is:

1. A sample positioning stage for positioning a sample to be inspected relative to an optical inspection device, the stage comprising:
   a first generally planar body on which a sample to be inspected can be carried;
   a second body directly coupled to the first body via bearings extending between them which constrain movement of the first body relative to the second body to a first plane that is substantially parallel to the plane of the first body;
   a drive system being selectively operable in a first mode to drive the first and second bodies in the first plane relative to each other toward a demanded relative position received from an electronic position input device, and a second mode in which the drive system provides less resistance to the relative movement of the first and second bodies in the first plane by an external force exerted on at least one of the first and second bodies than in the first mode, the drive system being engaged in both the first and second modes; and
   a selector operable to change the mode of operation from the first mode to the second mode in response to an input received at the stage.

2. A sample positioning stage as claimed in claim 1, in which the drive system is configured such that it is manually back-driven in the second mode due to any relative movement of the first and second bodies caused by an external force exerted on at least one of the first and second bodies in the at least one plane.

3. A sample positioning stage as claimed in claim 2, in which the drive system is configured to not resist manual back driving in the second mode.

4. A sample positioning stage as claimed in claim 1, in which the selector is configured to change the mode of operation of the drive system from the first mode to the second mode on detection of the application of an external force exerted on at least one of the first and second bodies in the at least one plane.

5. A sample positioning stage as claimed in claim 4, in which the selector comprises a sensor which is configured to detect relative movement of the first and second bodies.

6. A sample positioning stage as claimed in claim 5, in which the selector is configured to compare data which indicates the expected relative movement of the first and second bodies to data from the sensor which indicates the actual relative movement of the first and second bodies, and to change the mode of operation of the back-driveable drive system from the first mode to the second mode when the actual relative movement is different to the expected relative movement.

7. A sample positioning stage as claimed in claim 4, in which the selector is configured to change the mode of operation of the drive system from the second mode into the first mode on detection of the removal of the external force.

8. A sample positioning stage as claimed in claim 1, in which the drive system comprises a motor and a power source via which the net force applied by the motor is controlled to provide the resistance to relative movement of the first and second bodies by an external force.

9. A sample positioning stage as claimed in claim 8, in which no net force is applied by the motor in the second mode.

10. A sample positioning stage as claimed in claim 8, in which, in the first mode the power source is configured to increase the net force applied by the motor up to a maximum net force when the actual relative movement of the first and second bodies is different to the expected relative movement.

11. A sample positioning stage as claimed in claim 10, in which the selector is configured to monitor the net force applied by the motor and is configured to change the mode of operation of the drive system from the first mode to the second mode when the net force applied is at the maximum net force and when it is determined that the actual relative movement is different to the expected relative movement for a predetermined length of time.

12. A sample positioning stage as claimed in claim 1, in which the drive system is configured so that, on removal of the external force, the first and second bodies are moved relative to each other by the drive system only on receipt of a second demanded relative position from the position input device.

13. A sample positioning stage as claimed in claim 1, in which the demanded relative position to which the drive system is configured to drive the first and second bodies toward is set as being the current relative position of the first and second bodies on changing the mode of operation from the second mode to the first mode.

14. A sample positioning stage as claimed in claim 1, in which the selector comprises a switch movable by a user relative to the first and second bodies in order to change the mode of operation from the first mode to the second mode.

15. A sample positioning stage as claimed in claim 1, in which at least one of the first and second bodies comprises a handle for facilitating manual manipulation of the first and second bodies.

16. A sample positioning stage as claimed in claim 1, in which the first body is a plate and the second body is a carriage.

17. A sample positioning stage as claimed in claim 1, in which the first and second bodies can move relative to each other in a linear dimension.

18. An optical inspection apparatus comprising:
an optical inspection device; and
a sample positioning stage as claimed in claim 1 for positioning a sample to be inspected relative to the optical inspection device.

19. A method of operating sample positioning stage having a first generally planar body on which a sample to be inspected can be carried and a second body directly coupled to the first body via bearings extending between them which constrain movement of the first body relative to the second body to a first plane that is generally horizontal and substantially parallel to the plane of the first body, and a drive system operable to move the first and second bodies relative to each other toward a first demanded relative position received from the position input device, the method comprising:
  i. operating the drive system in a first mode in which the drive system is operable to drive the first and second bodies in the first plane relative to each other toward a demanded relative position received from an electronic position input device, the drive system providing a first level of resistance to relative movement of the first and second bodies in the first plane by an external force exerted on one of the first and second bodies in the first plane; and
  ii. in response to an input received at the stage, subsequently operating the drive system in a second mode, in which the drive system provides a second level of resistance to the relative movement of the first and second bodies in the at least one degree of freedom by an external force exerted on one of the first and second bodies, the second level of resistance being less than the first level of resistance,
in which the drive system is engaged in both the first and second modes.

20. A method as claimed in claim 19, in which the drive system is manually back-driven in the second mode due to relative movement of the first and second bodies caused by the external force exerted on one of the first and second bodies.

21. A method as claimed in claim 19, further comprising detecting the application of an external force exerted on one of the first and second bodies in the at least one degree of freedom.

22. A method as claimed in claim 21, further comprising automatically changing the mode of operation of the drive system from the first mode to the second mode on detection of the application of the external force.

23. A method as claimed in claim 21, in which the step of detecting the application of an external force comprises comparing data which indicates the expected relative movement of the first and second bodies to data which indicates the actual relative movement of the first and second bodies.

24. A method as claimed in claim 23, further comprising changing the mode of operation of the drive system from the first mode to the second mode when the actual relative movement is different to the expected relative movement for a predetermined length of time.

25. A method as claimed in claim 24, further comprising monitoring the net voltage applied, and changing the mode of operation of the drive system from the first mode to the second mode when the net voltage applied is at its maximum net voltage, and when the actual relative movement is different to the expected relative movement for a predetermined length of time.

26. A method as claimed in claim 19, in which operating the drive system in the first mode comprises applying a net voltage to the drive system up to a maximum net voltage.

27. A method as claimed in claim 26, in which operating the drive system in the second mode comprises applying no net voltage to the drive system.

28. A method as claimed in claim 19, further comprising changing the mode of operation of the drive system from the second mode to the first mode on detection of the removal of the external force.

29. A method as claimed in claim 19, further comprising subsequently operating the drive system to move the first and second bodies relative to each other only on receipt of a second demanded relative position from the position input device.

30. A method as claimed in claim 19, further comprising setting the demanded relative position to which the drive system is configured to drive the first and second bodies toward as being the current relative position of the first and second bodies on changing the mode of operation from the second mode to the first mode.

31. A sample positioning stage for positioning a sample to be inspected relative to an optical inspection device, comprising:
a first generally planar body on which a sample to be inspected can be carried;
a second body directly coupled to the first body via bearings extending between them which constrain movement of the first body relative to the second body to a first plane that is substantially parallel to the plane of the first body;

a drive system operable in a first mode to move the first and second bodies relative to each other toward a demanded relative position received from an electronic position input device; and a selector which is configured to detect the application of an external force exerted on at least one of the first and second bodies in the first plane and to change the mode of operation of the drive system from the first mode into a second mode on detection of the application of the external force, wherein in the second mode the drive system provides less resistance to the relative movement of the first and second bodies by an external force exerted on at least one of the first and second bodies than in the first mode.

* * * * *